(12) United States Patent
Jeon et al.

(10) Patent No.: US 11,432,630 B2
(45) Date of Patent: Sep. 6, 2022

(54) COVER DEVICE FOR HOLDING ELECTRONIC DEVICE

(71) Applicant: SAMSUNG ELECTRONICS CO., LTD., Suwon-si (KR)

(72) Inventors: Jongbae Jeon, Suwon-si (KR); Changsu Kim, Suwon-si (KR); Sangsik Na, Suwon-si (KR); Pranveer Singh Rathore, Suwon-si (KR); Hangyu Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 17/252,881

(22) PCT Filed: Apr. 15, 2019

(86) PCT No.: PCT/KR2019/004501
§ 371 (c)(1),
(2) Date: Dec. 16, 2020

(87) PCT Pub. No.: WO2020/013424
PCT Pub. Date: Jan. 16, 2020

(65) Prior Publication Data
US 2021/0120927 A1 Apr. 29, 2021

(30) Foreign Application Priority Data
Jul. 13, 2018 (KR) .................. 10-2018-0081528

(51) Int. Cl.
*A45C 11/00* (2006.01)
*A45C 13/00* (2006.01)
*A45C 13/36* (2006.01)

(52) U.S. Cl.
CPC ............ *A45C 11/00* (2013.01); *A45C 13/002* (2013.01); *A45C 13/36* (2013.01);
(Continued)

(58) Field of Classification Search
CPC ....... A45C 11/00; A45C 13/002; A45C 13/36; A45C 2011/002; A45C 2011/003;
(Continued)

(56) References Cited

U.S. PATENT DOCUMENTS 10,244,839 B1 * 4/2019 Hoover .................. A45C 11/00
2016/0191095 A1   6/2016 Santelli
2018/0019779 A1   1/2018 Chou

FOREIGN PATENT DOCUMENTS

KR   10-1204815     11/2012
KR   10-2015-0012975  2/2015
(Continued)

OTHER PUBLICATIONS

International Search Report for PCT/KR2019/004501 dated Jul. 19, 2019, 4 pages.
(Continued)

*Primary Examiner* — Shaima Q Aminzay
(74) *Attorney, Agent, or Firm* — Nixon & Vanderhye, P.C.

(57) ABSTRACT

A cover device according to an embodiment of the present invention, may include a first plate including a first surface and a second surface facing away from the first surface, and being substantially rectangular, the first plate including a first edge having a first length and extending in a first direction, a second edge having a second length longer than the first length and extending in a second direction orthogonal to the first direction, a third edge parallel to the first edge, having the first length, and extending in the first direction from the second edge, and a fourth edge parallel to the second edge, having the second length, and extending from the first edge in the second direction, a first sidewall perpendicular to the first surface and extending from the first edge, a second sidewall perpendicular to the first surface and the first sidewall and extending from the second edge, a third
(Continued)

sidewall perpendicular to the first surface and the second sidewall and extending from the third edge, and a fourth sidewall perpendicular to the first surface and the third sidewall and extending from the fourth edge, wherein the first surface, the first sidewall, the second sidewall, the third sidewall and the fourth sidewall together may form a recess for receiving and holding the electronic device, and the first surface may include at least one parting line having a third length longer than the first length and shorter than the second length and extending in the second direction.

20 Claims, 15 Drawing Sheets

(52) U.S. Cl.
CPC ... *A45C 2011/002* (2013.01); *A45C 2011/003* (2013.01); *A45F 2200/0516* (2013.01)

(58) Field of Classification Search
CPC ............. A45F 2200/0516; B29C 45/44; B29C 45/2673; B29C 45/4407; B29C 2945/761
USPC ...................................................... 455/575.8
See application file for complete search history.

(56) References Cited

FOREIGN PATENT DOCUMENTS

| KR | 10-1531976 | 6/2015 |
| KR | 10-2018-0032942 | 4/2018 |
| KR | 10-2018-0049770 | 5/2018 |

OTHER PUBLICATIONS

Written Opinion of the ISA for PCT/KR2019/004501 dated Jul. 19, 2019, 6 pages.

* cited by examiner

COVER DEVICE FOR HOLDING ELECTRONIC DEVICE

This application is the U.S. national phase of International Application No. PCT/KR2019/004501 filed Apr. 15, 2019 which designated the U.S. and claims priority to KR Patent Application No. 10-2018-0081528 filed Jul. 13, 2018, the entire contents of each of which are hereby incorporated by reference.

TECHNICAL FIELD

An embodiment of the present invention relates to a cover device to which an electronic device is coupled.

BACKGROUND ART

An electronic device is provided in various forms such as a smart phone, a tablet personal computer (PDA), a personal digital assistant (PDA) with development of digital technology.

As the electronic device gradually changes to high-tech, its cost is increasing, and a case accessory for protecting such an electronic device is drawing more attention.

DISCLOSURE OF INVENTION

Technical Problem

A protective case (or, a cover device) may be manufactured through injection molding. The injection molding is a molding method by injecting a resin into a mold and then cooling and solidifying the mold, and may include a process for opening the mold and pushing and taking out the cover device which is the molded part attached to an inside of the mold using an ejector. The cover device may be designed to have an area surrounding an edge portion of the electronic device to increase coupling to the electronic device. Such an area may act as a hooking part such as a hook and thus prevent the cover device from being separated from the electronic device even in fall. However, since the mold also has a molded portion corresponding to the hooking part, the molded part gives weight to the hooking part in the take-out process and such weight may cause damage (e.g., tear or plastic deformation). The damage of the hooking part in the take-out process may be prevented by using a material having elasticity or ductility in the injection molding, but it may be difficult to secure rigidity of the cover device. The degree of the hooking (e.g., a hooking amount or a hooking force) for the molded part in the take-out process may be lowered by decreasing a size (e.g., a width) of the hooking portion, but this goes against a purpose for increasing the coupling between the cover device and the electronic device and accordingly an alternative is required.

An embodiment of the present invention, may provide a mold for reducing the weight applied to the hooking portion for preventing the separation of the electronic device in the take-out process of the injection molding, and a cover device coupled to the electronic device, formed by using such a mold.

Solution to Problem

A cover device according to an embodiment of the present invention, may include a first plate including a first surface and a second surface facing away from the first surface, and being substantially rectangular, the first plate including a first edge having a first length and extending in a first direction, a second edge having a second length longer than the first length and extending in a second direction orthogonal to the first direction, a third edge parallel to the first edge, having the first length, and extending in the first direction from the second edge, and a fourth edge parallel to the second edge, having the second length, and extending from the first edge in the second direction, a first sidewall perpendicular to the first surface and extending from the first edge, a second sidewall perpendicular to the first surface and the first sidewall and extending from the second edge, a third sidewall perpendicular to the first surface and the second sidewall and extending from the third edge, and a fourth sidewall perpendicular to the first surface and the third sidewall and extending from the fourth edge, wherein the first surface, the first sidewall, the second sidewall, the third sidewall and the fourth sidewall together may form a recess for receiving and holding the electronic device, and the first surface may include at least one parting line having a third length longer than the first length and shorter than the second length and extending in the second direction.

Advantageous Effects of Invention

If a cover device is injection-molded by using a mold according to an embodiment of the present invention, not only it is possible to a hooking portion provided to prevent separation of an electronic device from being damaged in a take-out process of the injection molding, but also a cover device having the hooking portion of an expanded size may be manufactured to improve reliability and protection of the cover device for the electronic device.

BEST MODE FOR CARRYING OUT THE INVENTION

Figure 1:
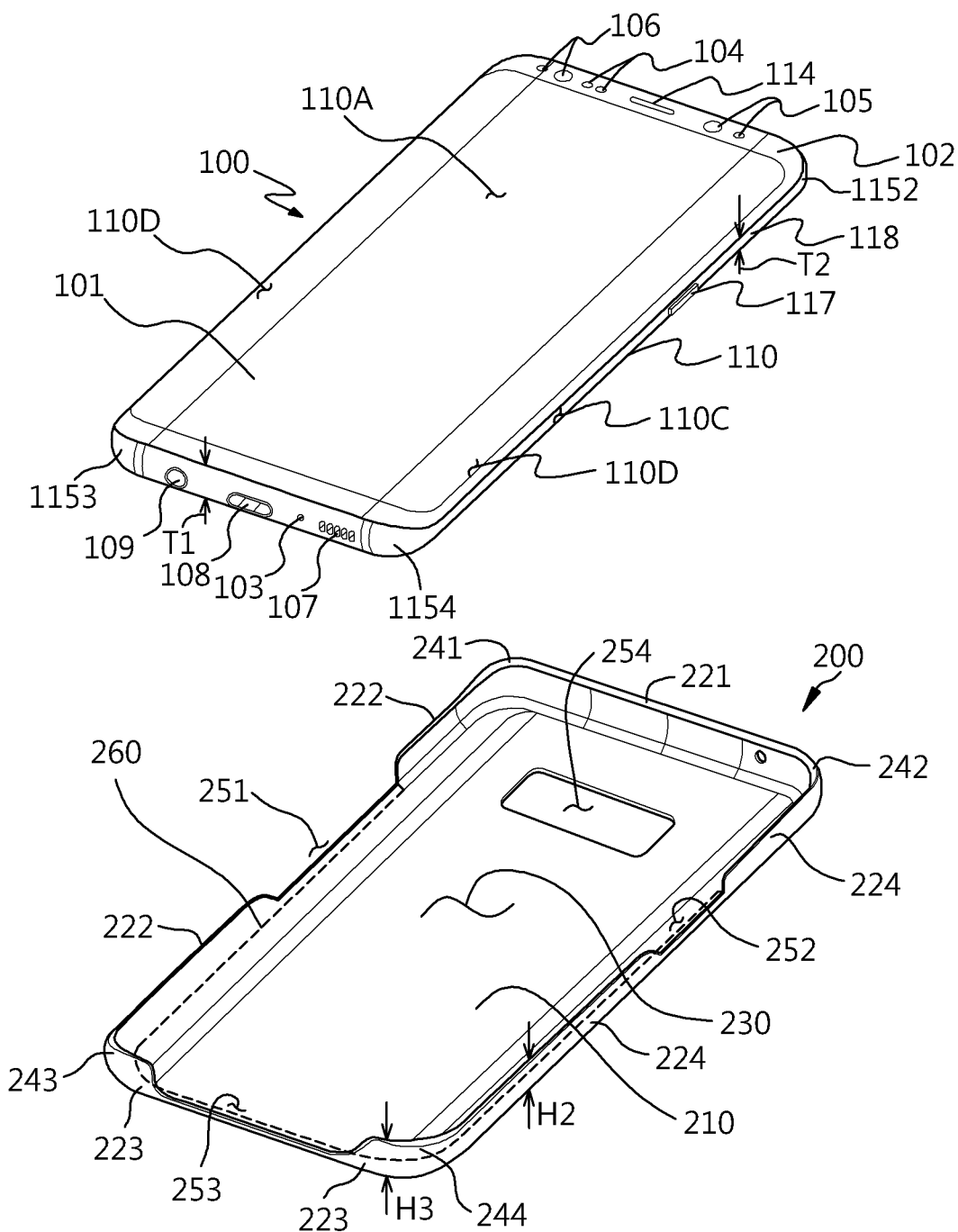
FIG. 1 is a front perspective view of an electronic device and a cover device detachable thereto according to an embodiment.

Hereinafter, various embodiments of the present disclosure are described with reference to the accompanying drawings. It should be appreciated that various embodiments of the present disclosure and the terms used therein are not intended to limit the technological features set forth in the present disclosure to particular embodiments, and include various changes, equivalents, or replacements of a corresponding embodiment. With regard to descriptions of the drawings, similar reference numerals may be used for similar or related elements. Singular form of a noun corresponding to an item may include one or more items, unless the relevant context clearly indicates otherwise. In this disclosure, expressions such as "have", "may have", "comprise" or "may comprise" refer to presence of a corresponding feature (e.g., numerical, functional, operational, or component such as a component), and do not exclude presence of an additional feature. In this disclosure, phrases such as "A or B", "at least one of A and B", "at least one of A or B", "A, B, or C", "at least one of A, B, and C", and "at least one of A, B, or C" may include all possible combinations of the items enumerated together in a corresponding one of the phrases. Terms such as "1st" and "2nd", or "first" or "second" may be used to simply distinguish a corresponding component from another corresponding component, and does not limit the corresponding components in other aspect (e.g., importance or order). If an element (e.g., a first element) is referred to, with or without the term "operatively" or "communicatively", as "coupled with" or "connected with" another element (e.g., a second element), it means that the element may be coupled with the another element directly (e.g., wiredly), wirelessly, or via a third element.

An electronic device according to various embodiments of the present disclosure may be a device of various types. The electronic device may include, for example, a portable communication device (e.g., a smart phone), a computer device, a portable multimedia device, a portable medical device, a camera, a wearable device, or a home appliance device. The electronic device according to an embodiment of the present disclosure is not limited the above-stated devices. In this disclosure, the term user may refer to a person who uses the electronic device or a device (e.g., an artificial-intelligence electronic device) which uses the electronic device.

Figure 2:
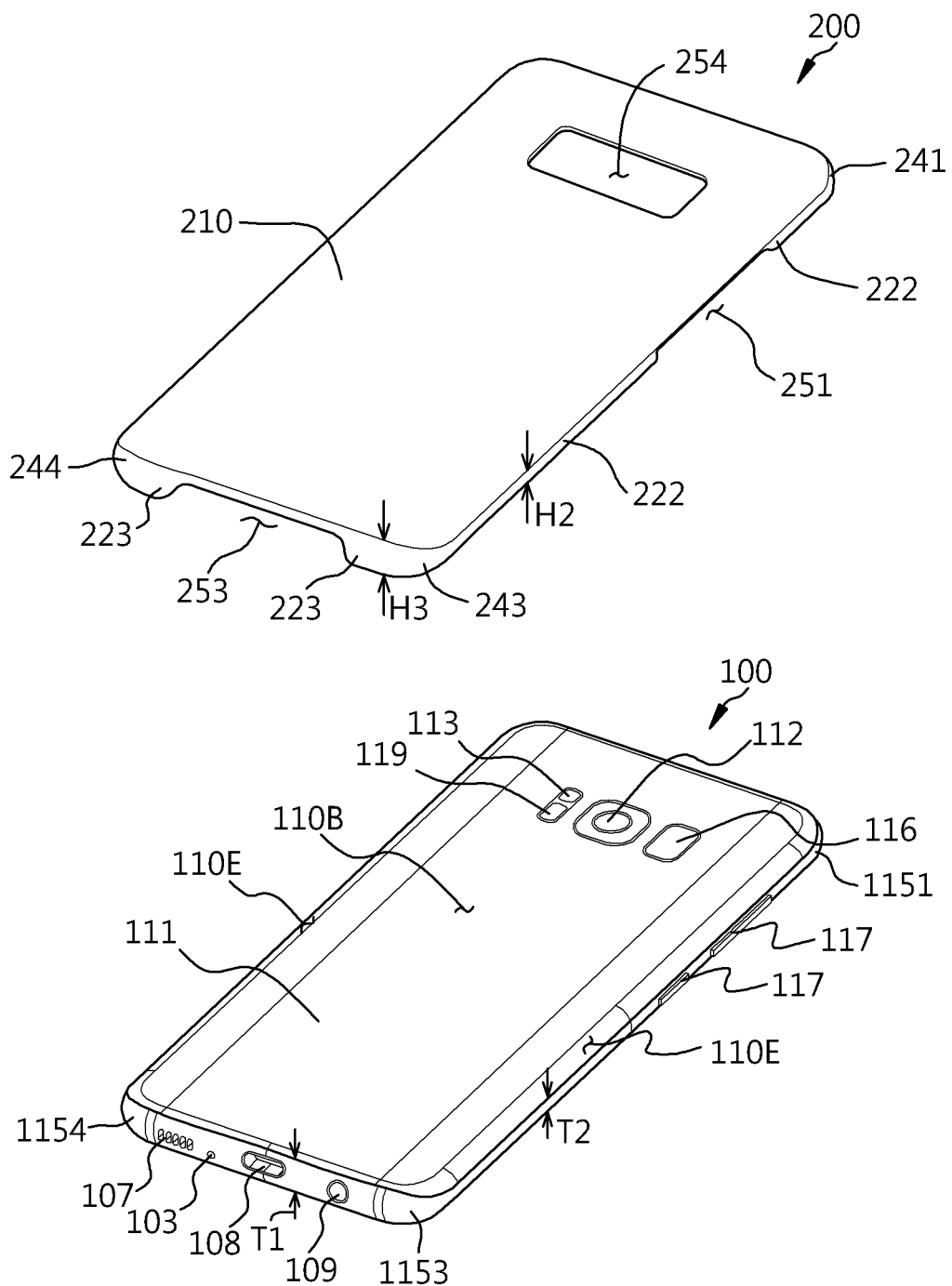
FIG. 2 is a rear perspective view of an electronic device and a cover device detachable thereto according to an embodiment.

FIG. 1 is a front perspective view of an electronic device and a cover device detachable thereto according to an embodiment. FIG. 2 is a rear perspective view of an electronic device and a cover device detachable thereto according to an embodiment.

Referring to FIGS. 1 and 2, a cover device (or a protective case) 200 according to an embodiment may be coupled to an electronic device 100 and protect the electronic device 100 from external shock, foreign matter, and the like. The electronic device 100 according to an embodiment may include a housing 110 including a first surface (or a front surface) 110A, a second surface (or a rear surface) 110B, and a side surface 110C surrounding a space between the first surface 110A and the second surface 110B. In another embodiment (not shown), the housing may refer to a structure which forms part of the front surface 110A, the rear surface 110B and the side surface 110C of FIG. 1. According to an embodiment, the front surface 110A may be formed by a front plate 102 (e.g., a glass plate including various coating layers, or a polymer plate) which is at least in part substantially transparent. The rear surface 110B may be formed by a rear plate 111 which is substantially opaque. The rear plate 111 may be formed by, for example, coated or colored glass, ceramic, polymer, metal (e.g., aluminum, stainless steel (STS), or magnesium), or a combination of at least two of the above materials. The side surface 110C may be formed by a side bezel structure (or a "side member") 118 which couples with the front plate 102 and the rear plate 111, and includes metal and/or polymer. In some embodiment, the rear plate 111 and the side bezel structure 118 may be integrally formed and include the same material (e.g., a metal material such as aluminum).

In the embodiment, the front plate 102 may include two first areas (or first curved areas) 110D which are bent from the front surface 110A toward the rear plate 111 and extended seamlessly, at both long edges of the front plate 102. In the embodiment (see FIG. 2), the rear plate 111 may include two second areas (or second curved areas) 110E which are bent from the rear surface 110B toward the front plate 102 and extended seamlessly, at both long edges. In some embodiment, the front plate 102 (or the rear plate 111) may include only one of the first areas 110D (or the second areas 110E). In another embodiment, some of the first areas 110D or the second areas 110E may not be included. In the above embodiments, if viewed from a side of the electronic device 100, the side bezel structure 118 may have a first thickness (or width) T1 on a side surface not including the first areas 110D or the second areas 110E, and a second thickness T2 which is thinner than the first thickness T1 on a side surface including the first areas 110D or the second areas 110E.

According to an embodiment, the cover device 200 may include a first plate 210 covering at least part of the rear surface 110B and sidewalls 221, 222, 223, and 224 covering at least part of the side surface 110C. For example, the first plate 210 may be substantially rectangular, and the first sidewall 221, the second sidewall 222, the third sidewall 223, and the fourth sidewall 224 may extend from an edge (not shown) of the first plate 210. The first sidewall 221 may interconnect one end of the second sidewall 222 and one end of the fourth sidewall 224, and the third sidewall 223 may interconnect the other end of the second sidewall 222 and the other end of the fourth sidewall 224. The cover device 200 includes a recess 230 formed by first plate 210 and the sidewalls 221, 222, 223, and 224, and the housing 110 may be coupled (or mounted) to the recess 230.

According to an embodiment, the cover device 200 may include a first corner 241 between the first sidewall 221 and the second side wall 222, a second corner 242 between the first sidewall 221 and the fourth sidewall 224, a third corner 243 between the third sidewall 223 and the second sidewall 222, and a fourth corner 244 between the third sidewall 223 and the fourth sidewall 224. The side surface 110C of the housing 110 includes four corner areas 1151, 1152, 1153, and 1154, and these corner areas 1151, 1152, 1153, and 1154 each may be formed as a laterally convex curved surface by smoothly interconnecting two orthogonal side surfaces (e.g., the upper side surface and the left side surface, the upper side surface and the right side surface, the lower side surface and the left side surface, or the lower side surface and the right side surface) of the side surface 110C. The corners 241, 242, 243, and 244 may be formed in a laterally convex curved shape to cover the corner areas 1151, 1152, 1153, and 1154 of the housing 110 disposed in the recess 230. The corners 241, 242, 243, and 244 not only allow the housing 110 to stay in the recess 230 without shaking or looseness, but also may be used as a hooking portion which prevents the housing 100 from being separated from the cover device 200. According to various embodiments, at least part of the first sidewall 221, the second sidewall 222, the third sidewall 223, or the fourth sidewall 224 may also be used as a hooking portion for the side surface 110C of the housing 110. This cover device 200 may be elastically attached to and detached from the housing 110.

According to various embodiments, at least part of the first corner 241, the second corner 242, the third corner 243, or the fourth corner 244 may include an extended hooking portion (not shown) which covers some area of the front surface 110A beyond a boundary between the side surface 110C and the front surface 110A to increase a hooking degree (e.g., a hooking amount or a hooking force) for the housing 110. This extended hooking portion may serve as a hook to block a cover device 300 from being separated from the electronic device 100 even in the fall.

According to an embodiment, although not depicted, the side surface 110C formed by the side bezel structure 118 may include a second side surface and a fourth side surface which surround the edges of the first areas 110D or the second areas 110E, a first side surface which interconnects one end of the second side surface and one end side of the fourth side surface, and a third side surface which interconnects the other end of the second side surface and the other end of the fourth side. The first side surface or the third side surface may have the first thickness T1, and the second side surface or the fourth side surface may have the second thickness T2 which is thinner than the first thickness T1. At the corner 1151 between the first side surface and the second side surface or at the corner 1153 between the third side surface and the second side surface, the thickness of the second side surface may gradually increase from the second thickness T2 to the first thickness T1. Both ends of the second side surface may gradually change from the second thickness T2 to the first thickness T1, and the edges of the first areas 110D of the front plate 102 adjoining the both ends of the second side surface may have a shape corresponding thereto. At the corner 1152 between the first side surface and the fourth side surface or the corner 1154 between the third side surface and the fourth side surface, the thickness of the fourth side may gradually increase from the second thickness T2 to the first thickness T1. Both ends of the fourth side surface may gradually change from the second thickness T2 to the first thickness T1, and the edges of the first areas 110D of the front plate 102 adjoining the both ends of the fourth side may have a shape corresponding thereto.

According to an embodiment, the first sidewall 221 may have a first height, and cover the first side surface of the side bezel structure 118. The second sidewall 222 may have a second height H2 smaller than the first height, and cover the second side surface of the side bezel structure 118. The fourth sidewall 224 may have the second height H2 and cover the fourth side surface of the side bezel structure 118. The third sidewall 223 may have a third height H3 which is greater than the second height H2 and equal to or different from the first height H1, and cover the third side surface of the side bezel structure 118. The first sidewall 221 and the second sidewall 222 of the different heights may be smoothly connected at the first corner 241. The first sidewall 221 and the fourth sidewall 224 of the different heights may be smoothly connected at the second corner 242. The third sidewall 223 and the second sidewall 222 of the different heights may be smoothly connected at the third corner 243. The third sidewall 223 and the fourth sidewall 224 of the different heights may be smoothly connected at the fourth corner 244.

According to various embodiments, at least part of the first sidewall 221, the second sidewall 222, the third sidewall 223 or the fourth sidewall 224 may an extended hooking portion which is extended to cover a partial area of the front surface 110A to increase the hooking amount for the housing 210.

According to an embodiment, the extended hooking portion which covers the partial area of the front surface 110A may be formed along the first sidewall 221, the first corner 241, and the second corner 242.

According to an embodiment, the electronic device 100 may include at least one or more of a display 101, audio modules 103, 107, and 114, sensor modules 104, 116, and 119, camera modules 105, 112, and 113, a key input device 117, a light emitting element 106, and connector holes 108 and 109. In some embodiment, the electronic device 100 may omit at least one (e.g., the key input device 117, or the light emitting element 106) of the components or may further include other component.

The display 101 may be exposed through, for example, a substantial part of the front plate 102. In some embodiment, at least part of the display 101 may be exposed through the front plate 102 forming the first surface 110A and the first areas 110D of the side surface 110C. In some embodiment, an edge of the display 101 may be formed to be substantially the same as an adjacent outer peripheral shape of the front plate 320. In other embodiment (not shown), to expand the exposed area of the display 101, an interval between the outer periphery of the display 101 and the outer periphery of the front plate 102 may be formed substantially the same.

In another embodiment (not shown), a recess or an opening may be formed in part of a screen display area of the display 101, and at least one or more of the audio module 114, the sensor module 104, the camera module 105, and the light emitting element 106 aligned with the recess or the opening may be included. In another embodiment (not shown), at least one or more of the audio module 114, the sensor module 104, the camera module 105, the fingerprint sensor 116, and the light emitting element 106 may be included, on the back of the screen display area of the display 101. In another embodiment (not shown), the display 101 may be coupled with or disposed adjacent to a touch sensing circuit, a pressure sensor for measuring touch intensity (pressure), and/or a digitizer for detecting a magnetic field stylus pen. In some embodiment, at least part of the sensor modules 104 and 119, and/or at least part of the key input device 117 may be disposed in the first areas 110D, and/or the second area 110E.

The audio modules 103, 107, and 114 may include a microphone hole 103 and speaker holes 107 and 114. The microphone hole 103 may include a microphone therein for acquiring an external sound, and a plurality of microphones may be disposed to detect a direction of the sound in some embodiment. The speaker holes 107 and 114 may include an external speaker hole 107 and a call receiver hole 114. In some embodiment, the speaker holes 107 and 114 and the microphone hole 103 may be implemented as a single hole, or a speaker may be included without the speaker holes 107 and 114 (e.g., a piezo speaker).

The sensor modules 104, 116, and 119 may generate an electrical signal or a data value corresponding to an operating state inside the electronic device 100 or an external environment state. The sensor modules 104, 116, and 119 may include, for example, a first sensor module 104 (e.g., a proximity sensor) and/or a second sensor module (not shown) (e.g., a fingerprint sensor) disposed in the first surface 110A of the housing 110, and/or a third sensor module 119 (e.g., a heart rate monitor (HRM) sensor) and/or a fourth sensor module 116 (e.g., a fingerprint sensor) disposed in the second surface 110B of the housing 110. The fingerprint sensor may be disposed in not only the first surface 110A (e.g., the display 101) but also the second surface 110B of the housing 110. The electronic device 100 may further include a sensor module which is not shown, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed in the first surface 110A of the electronic device 100, and a second camera device 112, and/or a flash 113 disposed in the second surface 110B. The camera devices 105 and 112 may include one or a plurality of lenses, an image sensor, and/or an image signal processor. The flash 113 may include, for example, a light emitting diode or a xenon lamp. In some embodiment, two or more lenses (an infrared camera, wide angle and telephoto lenses) and image sensors may be disposed in one surface of the electronic device 100.

The key input devices 117 may be disposed in the side surface 110C of the housing 110. In another embodiment, the electronic device 100 may not include some or all of the above-mentioned key input devices 117 and the key input devices 117 not included may be implemented as soft keys on the display 101. In some embodiment, the key input device may include the sensor module 116 disposed in the second surface 110B of the housing 110.

The light emitting element 106 may be disposed, for example, in the first surface 110A of the housing 110. The light emitting element 106 may provide, for example, state information of the electronic device 100 in the form of light. In another embodiment, the light emitting element 106 may provide, for example, a light source which is associated with the operation of the camera module 105. The light emitting element 106 may include, for example, an LED, an IR LED, and a xenon lamp.

The connector holes 108 and 109 may include a first connector hole 108 for receiving a connector (e.g., a USB connector) for transmitting and receiving power and/or data with an external electronic device, and/or a second connector hole (e.g., an earphone jack) 109 for receiving a connector for transmitting and receiving audio signals with an external electronic device.

According to an embodiment, the second sidewall 222 of the cover device 200 may include a first cut portion 251 not to cover part of the side surface 110C. For example, the first cut portion 251 may be provided by a concave shape toward the first plate 210. The first cut portion 251 may be adjacent to or in contact with the first plate 210. The key input device 117 disposed in the second side surface of the side surface 110C may be exposed to the outside through the first cut portion 251.

According to an embodiment, the fourth sidewall 224 of the cover device 200 may include a second cut portion 252 not to cover part of the side surface 110C. The second cut portion 252 may be provided in a similar form to the first cut portion 251. The key input device 117 disposed in the fourth side surface of the side surface 110C may be exposed to the outside through the second cut portion 252.

According to an embodiment, the third sidewall 223 of the cover device 200 may include a third cut portion 253 not to cover part of the side surface 110C. The third cut portion 253 may be provided in a form similar to the first cut portion 251. The connector holes 108 and 109, the microphone hole 103, and the speaker hole 107 disposed in the third side surface of the side surface 110C may be exposed to the outside through the third cut portion 253.

According to an embodiment, the first plate 210 of the cover device 200 may include an opening 254 not to cover part of the rear surface 110B. The second camera device 112, the flash 113, the sensor module 116, and the third sensor module 119 disposed on the rear surface 110B may be exposed to the outside through the opening 254.

According to an embodiment, the cover device 200 may be formed through injection molding with various thermoplastic resins such as polycarbonate. According to various embodiments, the cover device 200 may be formed with a transparent material, an opaque material, a colored material, and the like.

For example, a mold may include a first plate (e.g., a movable retainer plate) and a second plate (e.g., a stationary retainer plate). If the mold is closed, a molding space may be formed due to the coupling of the first plate and the second plate, and molten resin may be injected into the molding space. The molten resin which occupies the molding space may be hardened by circulating cooling water through the mold. If the first plate is transferred from the second plate and the mold is opened after the solidification, the molded part (e.g., the cover device 200) may be disposed in the second plate. If an ejector or an ejector pin pushes the cover device 200 out, the cover device 200 may be separated or taken out from the second plate.

According to an embodiment, the cover device 200 may include an outer surface (not shown), and an inner surface (not shown) which forms the recess 230. In the injection molding, the first plate may form the outer surface of the cover device 200, and the second plate may form the inner surface of the cover device 200. According to an embodiment, the second plate may include a first core and a second core which provide a molding surface (or an injection molding surface) contacting the resin to form the inner surface of the cover device 200. The inner surface of the cover device 200 may be divided into an area formed in the first core and an area formed in the second core, and a parting line 260 corresponding to a boundary of the areas may be formed in the inner surface of the cover device 200. According to an embodiment, the second core may not only form the inner surface of the cover device 200 but also be used as the ejector in the take-out after the mold is opened.

According to an embodiment, the parting line 260 may be defined as a mark in the form of a line formed along the boundary between the first core and the second core. The parting line 260 is indicated by a dotted line for the sake of understanding in FIG. 1, and may be formed on the inner surface in a substantially fine line form.

The cover device 200 may be divided into, for example, a first cover area and a second cover area based on the depicted parting line 260. According to an embodiment, the second cover area is a portion formed by the first plate and the second core (e.g., the ejector) of the second plate in the injection molding, and may include the first sidewall 221, the first corner 241 and part of the second sidewall 222 extending from the first corner 241, the second corner 242 and part of the fourth sidewall 224 extending from the second corner 242, and at least part of the first plate 210. According to an embodiment, if the parting line 260 is formed at a boundary between the first plate 210 and the second sidewall 222, at a boundary between the first plate 210 and the third sidewall 223, and at a boundary between the first plate 210 and the fourth sidewall 224, whole of the first plate 210 may be formed by the first plate and the second core of the second plate. The first cover area is a portion excluding the second cover area in the cover device 200, and may be formed by the first plate and the first core of the second plate in the injection molding.

According to an embodiment, the cover device 200 may be separated from the first core, by transferring the second core with respect to the first core in the injection molding. If the second core is transferred with respect to the first core, the second cover area disposed in the second core pulls the first cover area, and the first cover area may be separated from the first core. If the first cover area is separated from the first core, part of the first cover area may be pushed and bent by the first core and separated from the first core. For example, if the second core is transferred with respect to the first core, at least part of the third corner 243, the fourth corner 244 or the third sidewall 223 used as the hooking portion may receive the weight from a corresponding molding portion of the first core. According to an embodiment, at least part of the third corner 243, the fourth corner 244 or the third sidewall 223 may be designed to have a structure which is not damaged (e.g., torn or plastically deformed) by the weight. For example, the corresponding molding portion of the first core may be designed such that the third corner 243 or the fourth corner 244 does not cover some area of the front surface 110A beyond the boundary of the side surface 110C and the front surface 110A, and thus the hooking amount between the third corner 243 or the fourth corner 244 and the first core may be reduced. According to some embodiment, considering a strain rate of the third corner 243 or the fourth corner 244 and an allowable strain rate of the material of the cover device 200, the corresponding molding portion of the first core may be designed such that the third corner 243 or the fourth corner 244 covers some area of the front surface 110A. According to an embodiment, the corresponding molding portion of the first core may be designed such that the third sidewall 223 includes the third cut portion 253, and thus the hooking amount between the third sidewall 223 and the first core may be reduced.

According to an embodiment, if the second core is transferred with respect to the first core, the second cover area disposed in the second core does not receive the weight from the first core, and accordingly the first corner 241, the second corner 242 or the first sidewall 221 of the second cover area may be more free in designing to increase the hooking amount for the housing 110, comparing to the third corner 243, the fourth corner 244 or the third sidewall 223 of the first cover area. For example, at least part of the first corner 241, the second corner 242 or the first sidewall 221 of the second cover area may be designed with corresponding molding portion of the second core to have an extended hooking portion which further covers some area of the front surface 110A.

Figure 3:
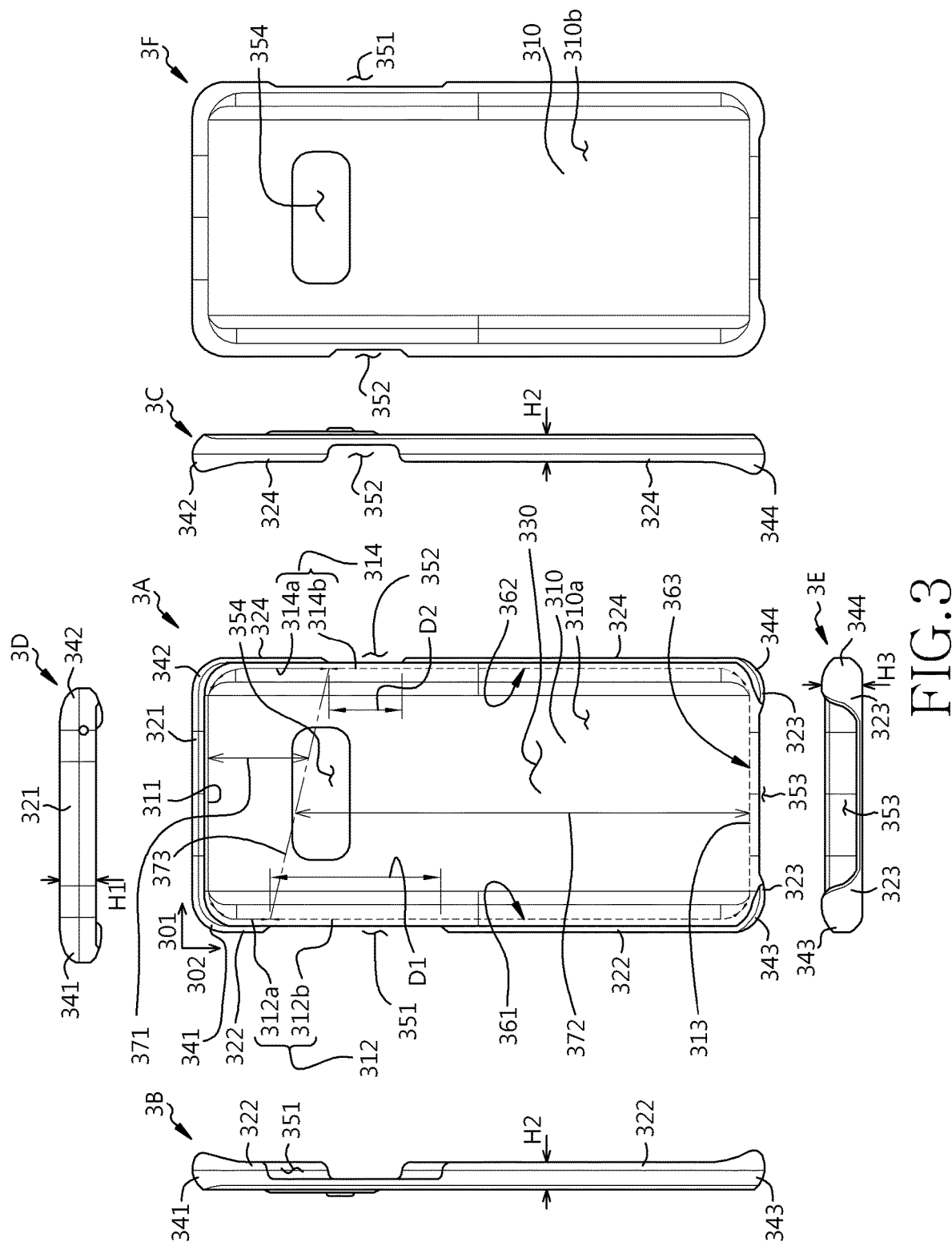
FIG. 3 illustrates views of a cover device viewed from various directions according to an embodiment.

FIG. 3 illustrates views of a cover device viewed from various directions according to an embodiment. 3A of FIG. 3 is a front view of the cover device 300. 3B of FIG. 3 is a left view of the cover device 300. 3C of FIG. 3 is a right view of the cover device 300. 3D is a top view of the cover device 300. 3E of FIG. 3 is a bottom view of the cover device 300. 3F of FIG. 3 is a back view of the cover device 300.

Referring to FIG. 3, the cover device 300 (e.g., 200 of FIG. 1 or 2) may include a first plate 310 (e.g., 210 of FIG. 1 or 2) including a first surface 310a, and a second surface 312 facing away from the first surface 310a. The first plate 310 may be substantially rectangular including a first edge 311, a second edge 312, a third edge 313, and a fourth edge 314. The first edge 311 may have a first length and extend in a first direction 301, and the second edge 312 may have a second length longer than the first length and extend in a second direction 302 orthogonal to the first direction 301. The third edge 313 may be parallel to the first edge 311 and have a first length, and extend from the second edge 312 in the first direction 301. The fourth edge 314 may be parallel to the second edge 312 and have the second length, and extend from the first edge 311 in the second direction 302. For example, the edges 311, 312, 313, and 314 may be defined as boundaries between the first surface 310a of the first plate 310 and surfaces of sidewalls 321, 322, 323, and 324.

According to an embodiment, the cover device 300 may include the first sidewall 321 (e.g., 221 of FIG. 1), the second sidewall 322 (e.g., 222 of FIG. 1), the third sidewall 323 (e.g., 223 of FIG. 1) and the fourth sidewall 324 (e.g., 224 of FIG. 1) extending from the first plate 310. The first sidewall 321 may be perpendicular to the first surface 310a and extend from the first edge 311. The second sidewall 322 may be perpendicular to the first surface 310a and extend from the second edge 312. The third sidewall 323 may be perpendicular to the first surface 310a and extend from the third edge 313. The fourth sidewall 324 may be perpendicular to the first surface 310a and extend from the fourth edge 314. According to an embodiment, the cover device 300 may provide a recess 330 (e.g., 230 of FIG. 1) formed by the first surface 310a, the first sidewall 321, the second sidewall 322, the third sidewall 323 and the fourth sidewall 324.

According to an embodiment, the cover device 300 may include a first corner 341 (e.g., 241 of FIG. 1) between the first sidewall 321 and the second sidewall 322, a second corner 342 (e.g., 242 of FIG. 1) between the first sidewall 321 and the fourth sidewall 324, a third corner 343 (e.g., 243 of FIG. 1) between the third sidewall 323 and the second sidewall 322, and a fourth corner 344 (e.g., 244 of FIG. 1) between the third sidewall 323 and the fourth sidewall 324.

According to an embodiment, the first sidewall 321 may have a first height H1. The second sidewall 322 or the fourth sidewall 324 may have a second height H2 which is smaller than the first height H1. The third sidewall 323 may have a third height H3 which is greater than the second height H2 and equal to or different from the first height H1. At the first corner 341, the height of the second sidewall 322 may gradually increase from the second height H2 to the first height H1. At the second corner 342, the height of the fourth sidewall 324 may gradually increase from the second height H2 to the first height H1. At the third corner 343, the height of the second sidewall 322 may gradually increase from the second height H2 to the third height H3. At the fourth corner 344, the height of the fourth sidewall 324 may gradually increase from the second height H2 to the third height H3.

According to an embodiment, if the cover device 300 is manufactured through the injection molding, parting lines 361, 362, and 363 (e.g., 260 of FIG. 1) may be formed on the inner surface of the recess 330. The mold may be designed in a structure to reduce damage of the first corner 341, the second corner 342 or the first sidewall 321, and the parting lines 361, 362, and 363 may be formed by this mold. Using the mold according to an embodiment, the cover device 300 may be formed by reducing the parting lines exposed to the outside as much as possible.

According to an embodiment, the parting lines 361, 362, and 363 may include the first parting line 361 and the second parting line 362 extending in a second direction 302, and the third parting line 363 extending in a first direction 301. The parting lines 361, 362, and 363 are indicated by a dotted line for the sake of understanding in FIG. 3, and may be formed on the inner surface in a substantially fine line form.

According to an embodiment, the first surface 310a may include a first area 371 adjoining the first edge 311, a first portion 312a of the second edge 312 and a first portion 314a of the fourth edge 414. The first surface 310a may include a second area 372 adjoining the third edge 313, a second portion 312b of the second edge 312 and a second portion 314b of the fourth edge 314. According to an embodiment, the first parting line 361 and the second parting line 362 may have a third length which is shorter than the second length (e.g., the length of the second edge 312) and extend substantially across the second area 372 rather than the first area 371.

For example, in the front view 3A of FIG. 3, a line 373 interconnecting a first point (not shown) between the first portion 312a and the second portion 312b of the second edge 312, and a second point (not shown) between the first portion 314a and the second portion 314b of the fourth edge 314 is indicated as a boundary between the first area 371 and the second area 372, but this boundary may be partitioned differently between the first point and the second point.

According to an embodiment, the second sidewall 322 may include a first cut portion 351 (e.g., 251 of FIG. 1) extending along the second portion 312b of the second edge 312. For example, the first cut portion 351 may be extended in a first width D1 along the second edge 312 from the first point between the first portion 312a and the second portion 312b of the second edge 312.

According to an embodiment, the first parting line 361 may extend from the first cut portion 351 to the third edge 313. For example, the first parting line 361 may extend along the second edge 312 from the first point between the first portion 312a and the second portion 312b of the second edge 312. The first parting line 361 may be formed at the second edge 312, or in some embodiment, may be formed adjacent to the second edge 312 or spaced apart from the second edge 312.

According to various embodiments, although not depicted, the cover device 300 may further include a parting line extended from the first point between the first portion 312a and the second portion 312b of the second edge 312 to the first cut portion 351.

According to an embodiment, the fourth sidewall 324 may include a second cut portion 352 (e.g., 252 of FIG. 1) extending along the second portion 314b of the fourth edge 314. For example, the second cut portion 352 may be extended in a second width D2 different from the first width D1 along the fourth edge 314 from the second point between the first portion 314a and the second portion 314b of the fourth edge 314. According to some embodiment, the second cut portion 352 may be extended in the first width D1.

According to an embodiment, the second parting line 362 may extend from the second cut portion 352 to the third edge 313. For example, the second parting line 362 may extend along the second edge 314 from the second point between the first portion 314a and the second portion 314b of the fourth edge 314. The second parting line 362 may be formed at the fourth edge 314 or, according to some embodiment, may be formed adjacent to the fourth edge 314 or apart from the fourth edge 314.

According to various embodiments, although not depicted, the cover device 300 may further include a parting line extending from the second point between the first portion 314a and the second portion 314b of the fourth edge 314 to the second cut portion 352.

According to an embodiment, the third parting line 363 may interconnect one end of the first parting line 361 and one end of the second parting line 362. The third parting line 363 may be formed at the third edge 313, or in some embodiment, may be formed adjacent to the third edge 313 or apart from the third edge 313.

According to an embodiment, the first parting line 361 and the third parting line 363 may be connected with a curve following the third corner 343. The second parting line 362 and the third parting line 363 may be connected with a curve following the fourth corner 344.

According to various embodiments, the cover device 300 may include an opening 354 (e.g., 254 of FIG. 1) formed in the first plate 310.

Figure 4:
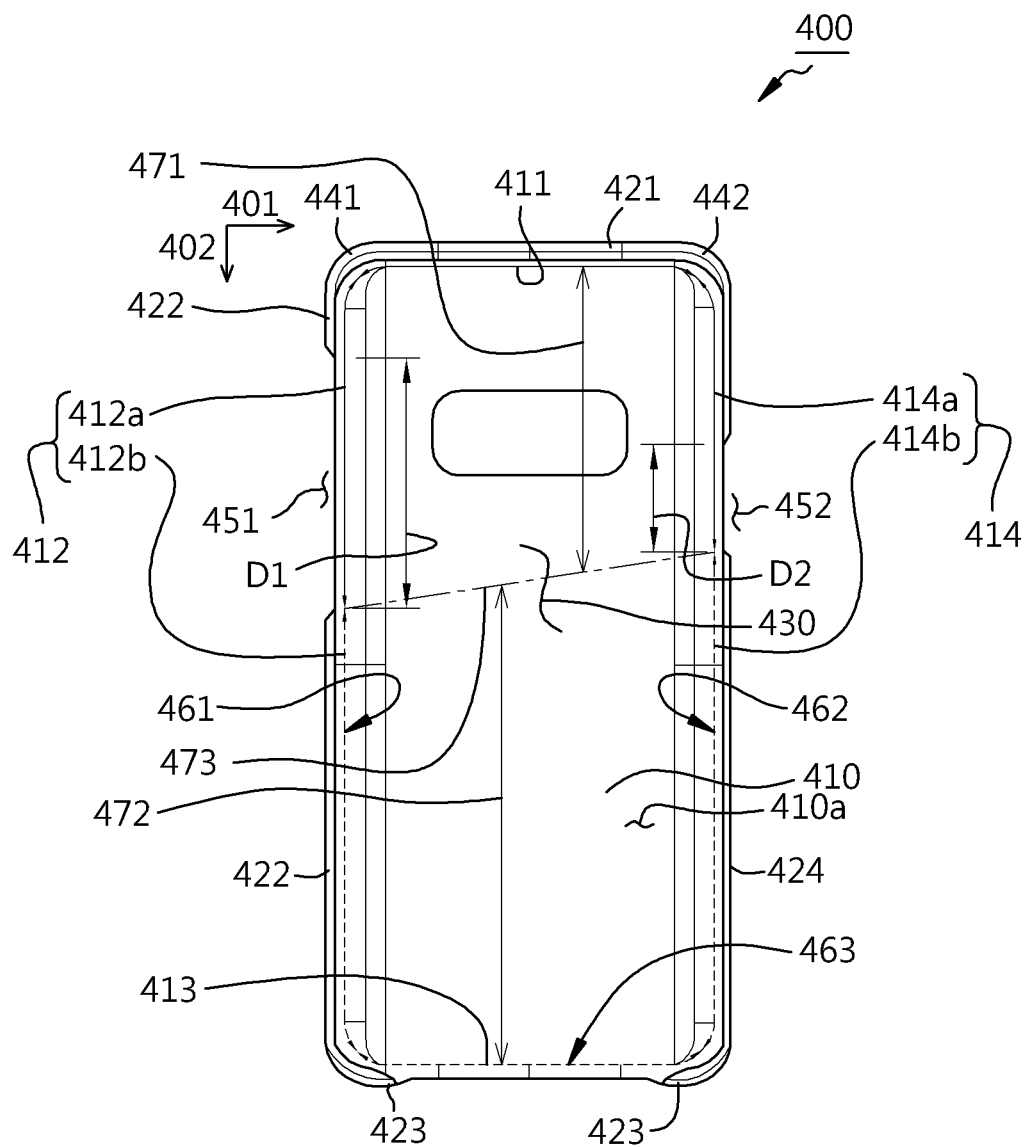
FIG. 4 is a front view of a cover device according to various embodiments.

FIG. 4 is a front view of a cover device according to various embodiments.

Referring to FIG. 4, a cover device 400 (e.g., 200 of FIG. 1 or 2) according to an embodiment may include a first plate 410 (e.g., 310 of FIG. 3), a first sidewall 421 (e.g., 321 of FIG. 3), a second sidewall 422 (e.g., 322 of FIG. 3), a third sidewall 423 (e.g., 323 of FIG. 3) and a fourth sidewall 424 (e.g., 324 of FIG. 3). The cover device 400 may provide a recess 430 (e.g., 330 of FIG. 3) by the first plate 410 and the sidewalls 421, 422, 423, and 424.

According to an embodiment, a first surface 410a (e.g., 310a of FIG. 3) of the first plate 410 may include a first area 471 adjoining a first edge 411, a first portion 412a of the second edge 412 and a first portion 414a of the fourth edge 414. The first surface 410a may include a second area 472 adjoining the third edge 413, a second portion 412b of the second edge 412 and a second portion 414b of the fourth edge 414. For example, in the front view of FIG. 4, a line 473 interconnecting a first point (not shown) between the first portion 412a and the second portion 412b of the second edge 412, and a second point (not shown) between the first portion 414a and the second portion 414b of the fourth edge 414 is indicated by a boundary between the first area 471 and the second area 472, but this boundary may be partitioned differently between the first point and the second point.

According to an embodiment, the second sidewall 422 may include a first cut portion 451 (e.g., 251 of FIG. 1) extending along the first portion 412a of the second edge 412. For example, the first cut portion 451 may extend in a first width D1 along the second edge 412 from the first point between the first portion 412a and the second portion 412b of the second edge 412.

According to an embodiment, the fourth sidewall 424 may include a second cut portion 452 (e.g., 252 of FIG. 1) extending along the first portion 414a of the fourth edge 414. For example, the second cut portion 452 may extend in a second width D2 along the fourth edge 414 from the second point between the first portion 414a and the second portion 414b of the fourth edge 414.

According to an embodiment, if the cover device 400 is manufactured through the injection molding, parting lines 461, 462, and 463 (e.g., 260 of FIG. 1) may be formed on an inner surface of the recess 430. A mold may be designed in a structure for reducing damage of the first corner 441, the second corner 442 or the first sidewall 421, and the parting lines 461, 462, and 463 may be formed by this mold. Using the mold according to an embodiment, the cover device 400 may be formed by reducing the parting lines exposed to the outside as much as possible.

According to an embodiment, the parting lines 461, 462, and 463 may include the first parting line 461 and the second parting line 462 extending in a second direction 402 (e.g., 302 of FIG. 3), and the third parting line 463 extending in a first direction 401 (e.g., 301 of FIG. 3).

According to an embodiment, the first parting line 461 and the second parting line 462 may extend substantially across the second area 472 rather than the first area 471.

According to an embodiment, the first parting line 461 may extend along the second edge 412 from the first point between the first portion 412a and the second portion 412b of the second edge 412.

According to various embodiments, although not depicted, the cover device 400 may further include a parting line extending from the first point between the first portion 412a and the second portion 412b of the second edge 412 to the first cut portion 451.

According to an embodiment, the second parting line 462 may extend along the fourth edge 414 from the second point between the first portion 414a and the second portion 414b of the fourth edge 414.

According to various embodiments, although not depicted, the cover device 400 may further include a parting line extending from the second point between the first portion 414a and the second portion 414b of the fourth edge 414 to the second cut portion 452.

According to various embodiments, the third parting line 463 (e.g., 363 of FIG. 3) may extend along the third edge 413 and interconnect between the first parting line 461 and the second parting line 462.

According to an embodiment, the mold used to form the cover device 300 of FIG. 3 or the cover device 400 of FIG. 4 may include a first plate (e.g., a movable retainer plate) and a second plate (e.g., a stationary retainer plate). For example, the first plate may include an empty space (e.g., a cavity) formed to be concave to introduce the molten resin. The second plate may include a first core and a second core for providing a molding surface which contacts the resin to form an inner surface (e.g., a surface forming the recess 330 of FIG. 3) of the cover device (e.g., 300 of FIG. 3 or 400 of FIG. 4). If the mold is closed, a molding space is formed by the coupling of the first plate and the second plate, and the molten resin may be injected into the molding space. If the molten resin occupying the molding space is hardened and then the first plate is transferred from the second plate and the mold is opened, the molded part (e.g., the cover device 300 of FIG. 3) may be disposed on the second plate. For example, the cover device 300 may be attached to the second plate, by an undercut on the second plate or a hooking portion formed in the cover device 300. The inner surface of the cover device 300 or 400 may be divided into an area formed in the first core and an area formed in the second core, and parting lines (e.g., 361, 362, and 363 of FIG. 3, or 461, 462, and 463 of FIG. 4) corresponding to a boundary of the areas may be formed on the inner surface. According to an embodiment, the second core may not only form the inner surface of the cover device (e.g., 300 of FIG. 3 or 400 of FIG. 4) but also be used as an ejector in the take-out after the mold is opened.

Figure 5A:
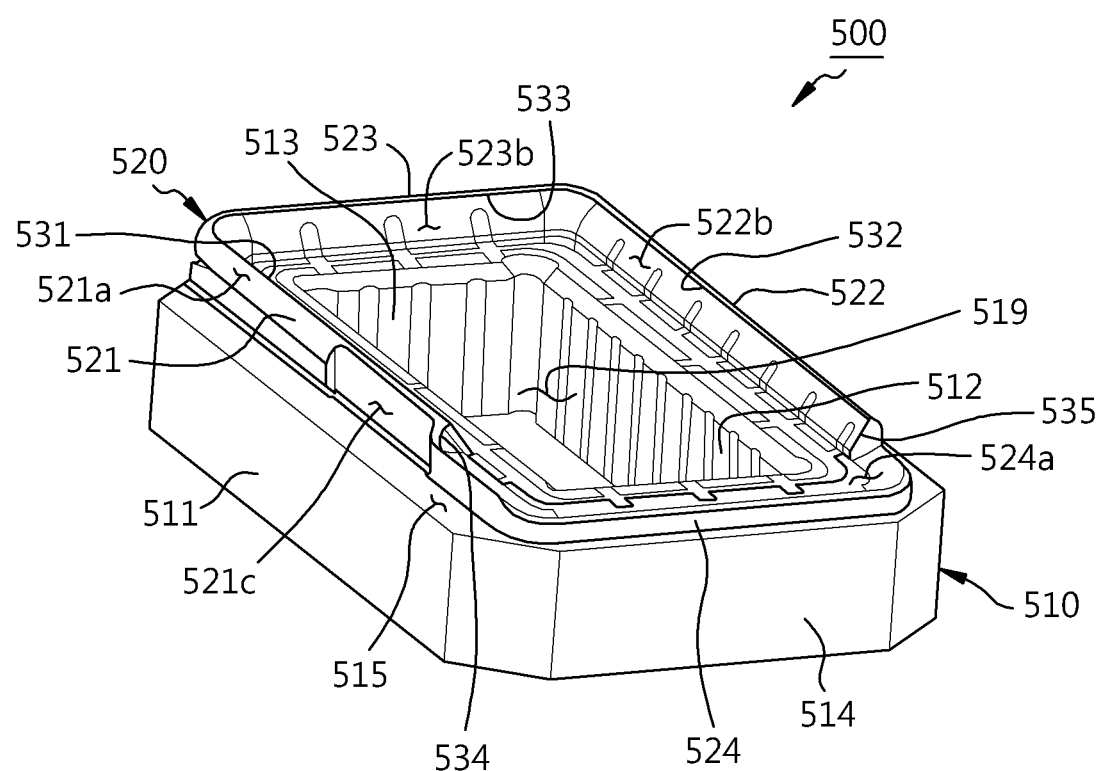
FIGS. 5A and 5B are perspective views of a first core according to an embodiment.
Figure 5B:
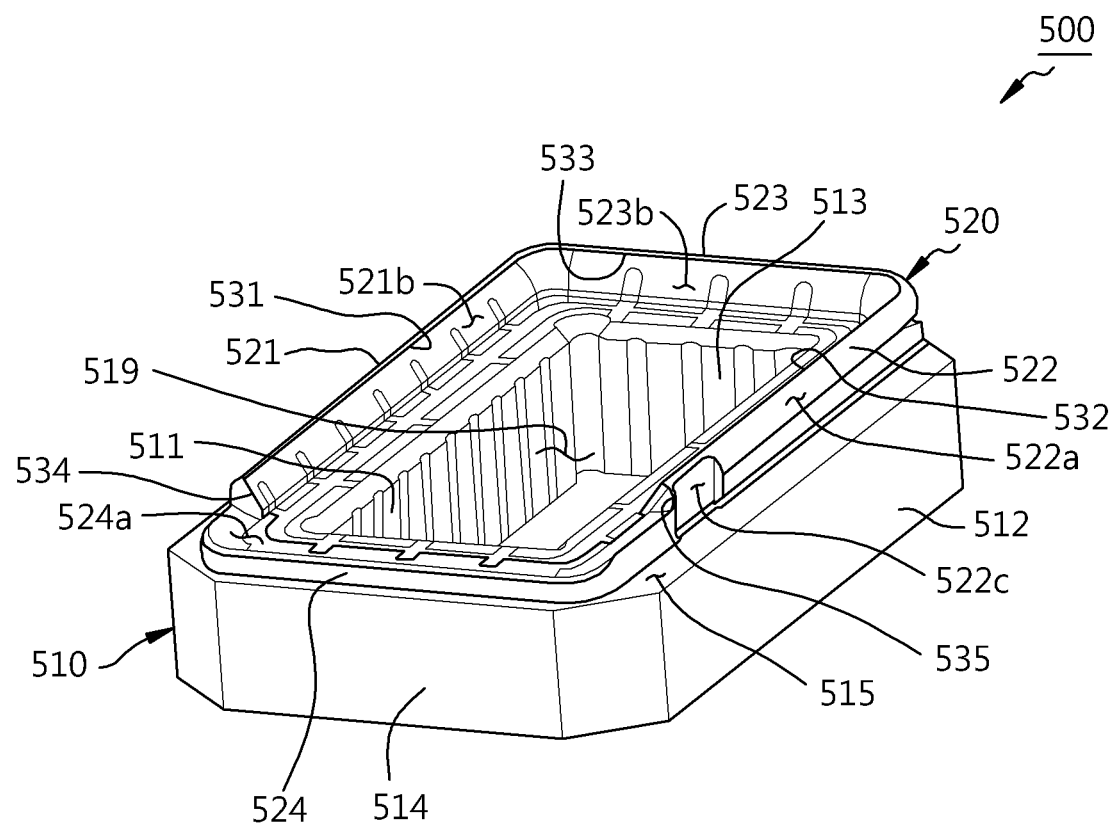

FIGS. 5A and 5B are perspective views of a first core according to an embodiment.

Referring to FIGS. 5A and 5B, a first core 500 may include a first core plate 520 which provides a molding surface for forming part of the inner surface of the cover device (e.g., 300 of FIG. 3), and a base plate 510 which supports the first core plate 520 and allows transfer of a second core (e.g., 600 of FIG. 6A or 6B) with respect to the first core 500. The base plate 510 may be provided in a ring shape including four walls 511, 512, 513, and 514 which laterally surround a hollow 519. The first core plate 520 may include a first molding portion 521, a second molding portion 522, and a third molding portion 523 disposed on one side 515 of the base plate 510. The first molding portion 521 may extend along part of the first wall 511, the second molding portion 522 may extend along part of the second wall 512, and the third molding portion 523 may extend along the third wall 513. The first molding portion 521 and the second molding portion 522 may be parallel, and the third molding portion 523 may interconnect one end of the first molding portion 521 and one end of the second molding portion 522 and be perpendicular to the first molding portion 521 or the second molding portion 522.

According to an embodiment, the first molding portion 521 may include a first molding surface 521a for forming part of an inner surface of a second sidewall (e.g., 322 of FIG. 3). The second molding portion 522 may include a second molding surface 522a for forming part of an inner surface of a fourth sidewall (e.g., 324 of FIG. 3). The third molding portion 523 may include a third molding surface (not shown) for forming an inner surface of the third sidewall (e.g., 323 of FIG. 3).

According to an embodiment, corners between the third molding surface and the first molding surface 521a are smoothly connected, which may be used to form a third corner (e.g., 343 of FIG. 3). Corners between the third molding surface and the second molding surface 522a are smoothly connected, which may be used to form a fourth corner (e.g., 344 of FIG. 3).

Figure 6A:
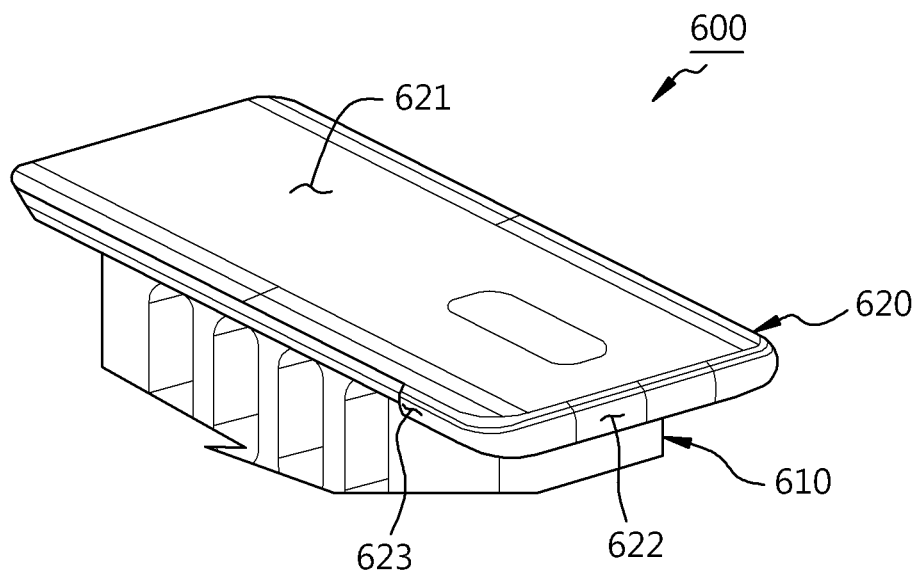
FIGS. 6A and 6B are perspective views of a second core according to an embodiment.
Figure 6B:
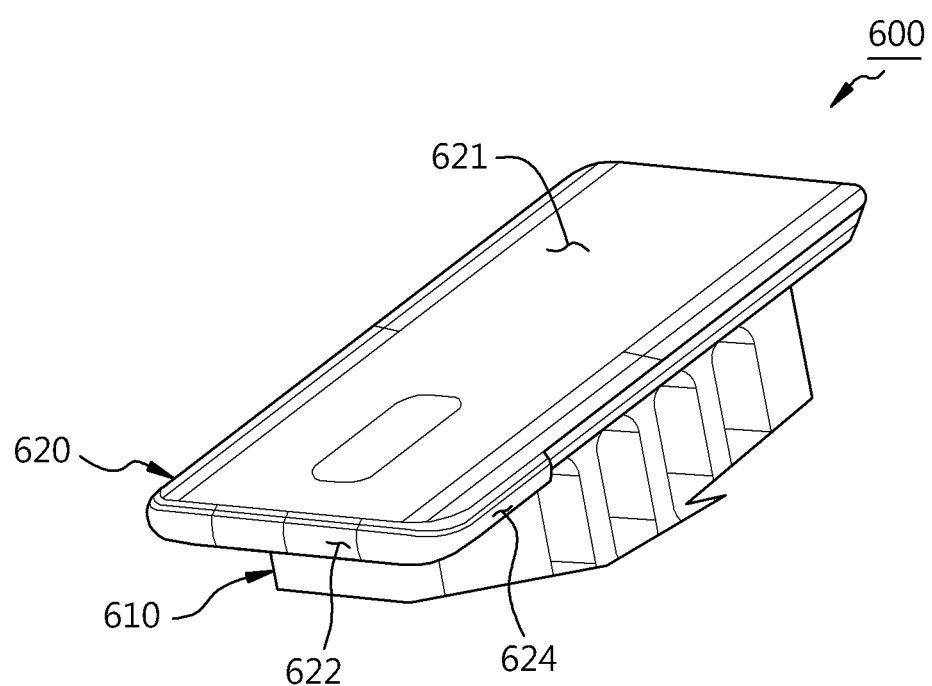

According to an embodiment, the first molding portion 521 may include a first parting surface 521b for the second core (e.g., 600 of FIG. 6A or 6B). The second molding portion 522 may include a second parting surface 522b for the second core. The third molding portion 523 may include a third molding surface 523b for the second core. A space formed by the first parting surface 521b, the second parting surface 522b, and the third parting surface 523b may be used as a parting space into which the second core is fitted. According to an embodiment, the first parting surface 521b, the second parting surface 522b, or the third parting portioning 523b may include an inclined surface for smoothly inserting the second core.

According to an embodiment, the first core plate 520 may include a core parting portion 524 disposed on one side surface 515 of the base plate 510. The core parting portion 524 may interconnect the other end of the first molding portion 521 and the other end of the second molding portion 522, and extend along part of the first wall 511, the fourth wall 514, and part of the second wall 512. According to an embodiment, the core parting portion 524 may include a fourth parting surface 524a for the second core (e.g., 600 of FIG. 6), and the fourth parting surface 524a may be formed to be lower than the molding portions 521, 522, and 523 with respect to the surface 515 of the base plate 510. Thus, the core fitting part 524 may include a parting space into which part of the second core (e.g., 600 of FIG. 6) is fitted.

According to various embodiments, to form a first cut portion (e.g., 351 of FIG. 3), the first molding portion 521 may have a recessed parting surface 521c to which part of the first plate (e.g., the stationary retainer plate) is fitted. To form a second cut portion (e.g., 352 of FIG. 3), the second molding portion 522 may include a recessed parting surface 522c to which part of the first plate is fitted.

According to an embodiment, although not depicted, to form a third cut portion (e.g., 353 of FIG. 3), the third molding portion 523 may include a recessed parting surface (not shown) to which part of the first plate (e.g., the stationary retainer plate) is fitted.

According to an embodiment, parting lines (e.g., the first parting line 361, the second parting line 362, and the third parting line 363) of the cover device (e.g., 300 of FIG. 3), may be formed an edge 531 between the first molding surface 521a and the first parting surface 521b, an edge 532 between the second molding surface 522a and the second parting surface 522b, an edge 533 between the third molding surface 523a and the third parting surface 523b, an edge 534 between the first molding surface 521a and the core parting portion 524, and an edge 535 between the second molding surface 522a and the core parting portion 524. If using a mold including a first core 500, and a second core corresponding to the first core 500 according to an embodiment, the cover device (e.g., 300 of FIG. 3) may be formed by minimizing the parting lines exposed to the outside. For example, referring back to FIG. 3, the first parting line 361 may be formed by the edge 531 between the first molding surface 521a and the first parting surface 521b. The second parting line 362 may be formed by the edge 532 between the second molding surface 522a and the second parting surface 522b. The third parting line 363 may be formed by the edge 533 between the third molding surface 523a and the third parting surface 523b. A parting line (not shown) extending from the first point between the first portion 312a and the second portion 312b of the second edge 312 to the first cut portion 351, may be formed by the edge 534 between the first molding surface 521 and the core parting portion 524. A parting line (not shown) extending from the second point between the first portion 412a and the second portion 412b of the fourth edge 314 to the second cut portion 352 may be formed by the edge 535 between the second molding surface 522a and the core parting portion 524.

FIGS. 6A and 6B are perspective views of a second core according to an embodiment.

Referring to FIGS. 6A and 6B, the second core 600 may include a second core plate 620 which provides a molding surface for forming part of the inner surface of the cover device (e.g., 300 of FIG. 3), and a slider 610 for supporting transfer of the second core plate 620. The slider 610 may be inserted into a hollow (e.g., 519 of FIG. 5A or 5B) of a first core (e.g., 500 of FIG. 5A or 5B), and the second core plate 620 may be guided and transferred thereto.

According to an embodiment, the second core plate 620 is in a shape including parting surfaces (not shown) corresponding to the parting surfaces 521b, 522b, 523b, and 524a of the first core 500 shown in FIG. 5A or 5B, and may include a molding surface for forming the inner side of the cover device (e.g., 300 of FIG. 3) together with the first core plate (e.g., 520 of FIG. 5A or 5B) of the first core 500. For example, the second core plate 620 may include a molding surface 621 for forming the first surface 310a of the first plate (e.g., 310 of FIG. 3), a molding surface 622 for forming the inner surface of the first sidewall (e.g., 321 of FIG. 3), a molding surface 623 for forming part of the inner surface of the second sidewall (e.g., 322 of FIG. 3), and a molding surface 624 for forming part of the inner surface of the fourth sidewall (e.g., 324 of FIG. 3).

Referring to FIGS. 5A, 5B, 6A and 6B, in an embodiment, due to boundaries between the molding surfaces 521a, 522a and 523a of the first core plate 520 and the molding surfaces 621, 622, 623, and 624 of the second core plate 520, parting lines (e.g., 361, 362, and 363 of FIG. 3) may be formed on the inner surface of the cover device (e.g., 300 of FIG. 3).

Figure 7:
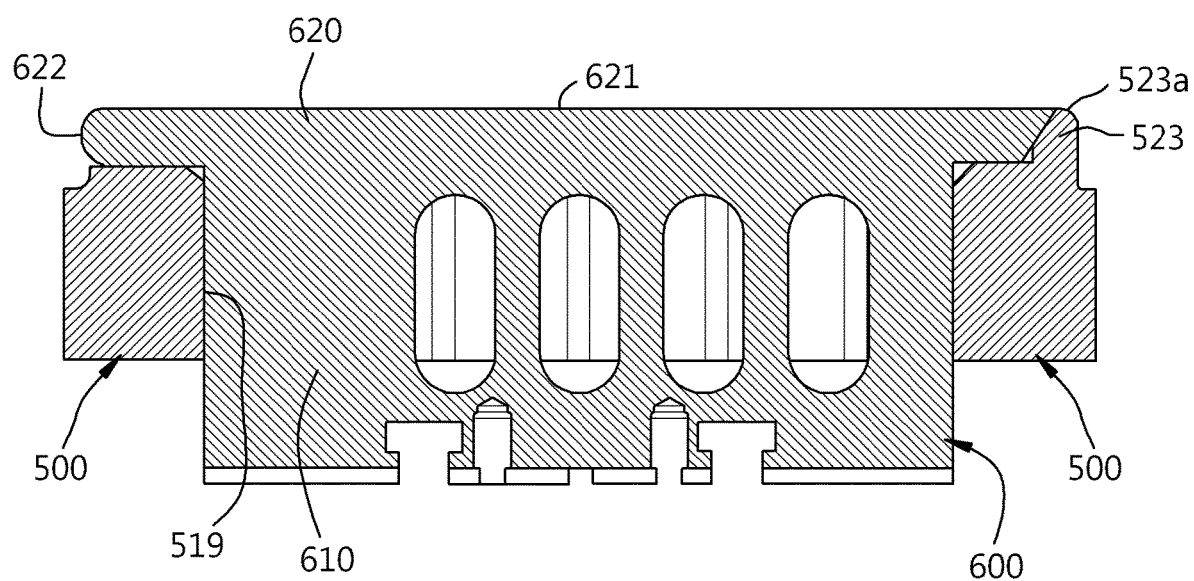
FIG. 7 is a cross-sectional view of a second core which is closed with respect to a first core, according to an embodiment.

FIG. 7 is a cross-sectional view of a second core 600 which is closed (or joined) for a first core 500, according to an embodiment.

Referring to FIG. 7, according to an embodiment, the slider 610 may be inserted into the hollow 519 of the first core 500, and the second core plate 620 may be guided and closed to the first core 500.

According to an embodiment, the second core plate 620 may include the molding surface 621 for forming the first surface 310a of the first plate (e.g., 310 of FIG. 3) and the molding surface 622 for forming the inner surface of the first sidewall (e.g., 321 of FIG. 3). The third molding portion 523 of the first core 500 may include the molding surface 523a for forming the inner surface of the third sidewall (e.g., 323 of FIG. 3).

Figure 8:
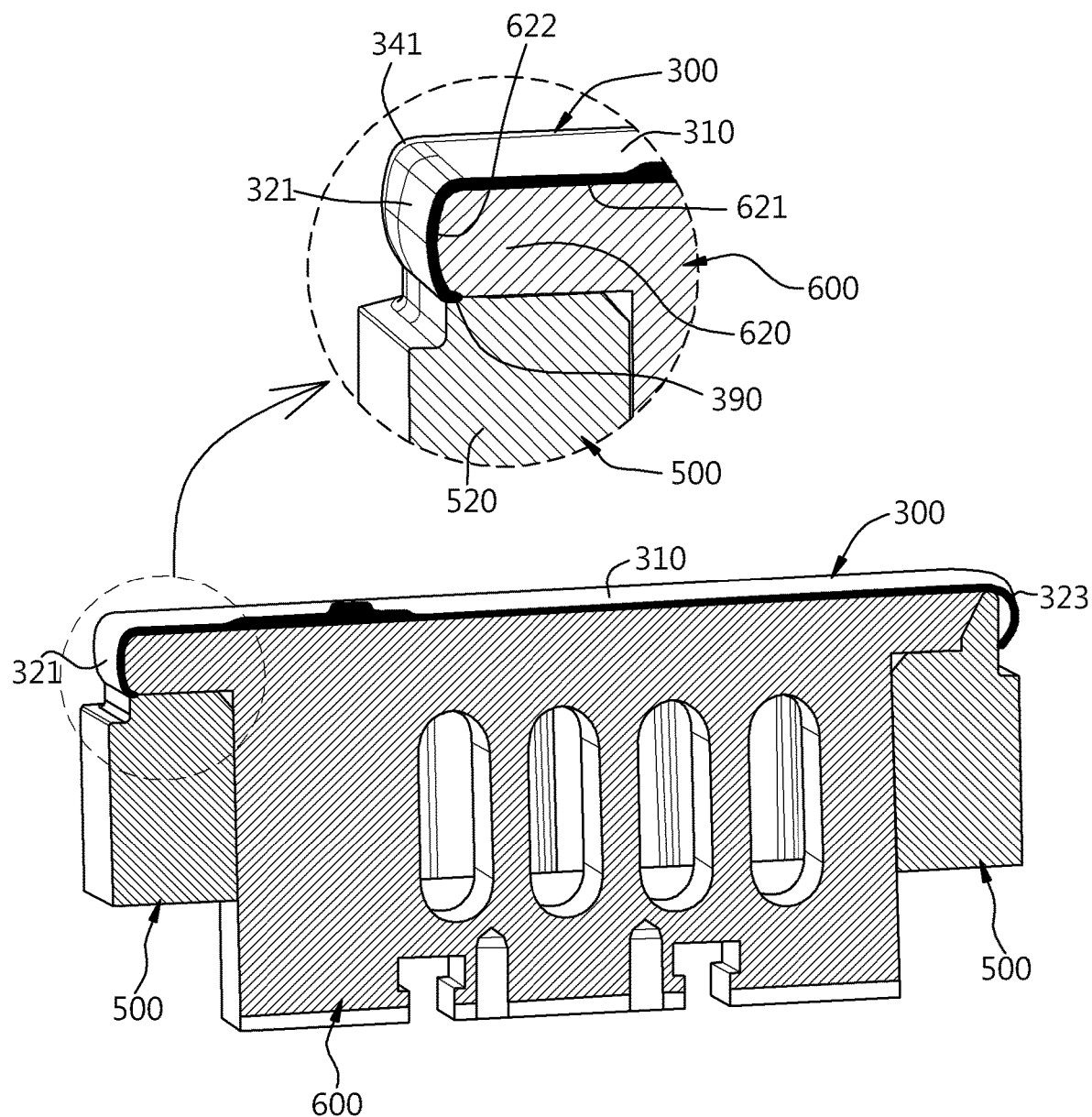
FIGS. 8, 9 and 10 are cross-sectional views for illustrating a molding flow of a cover device according to an embodiment.
Figure 9:
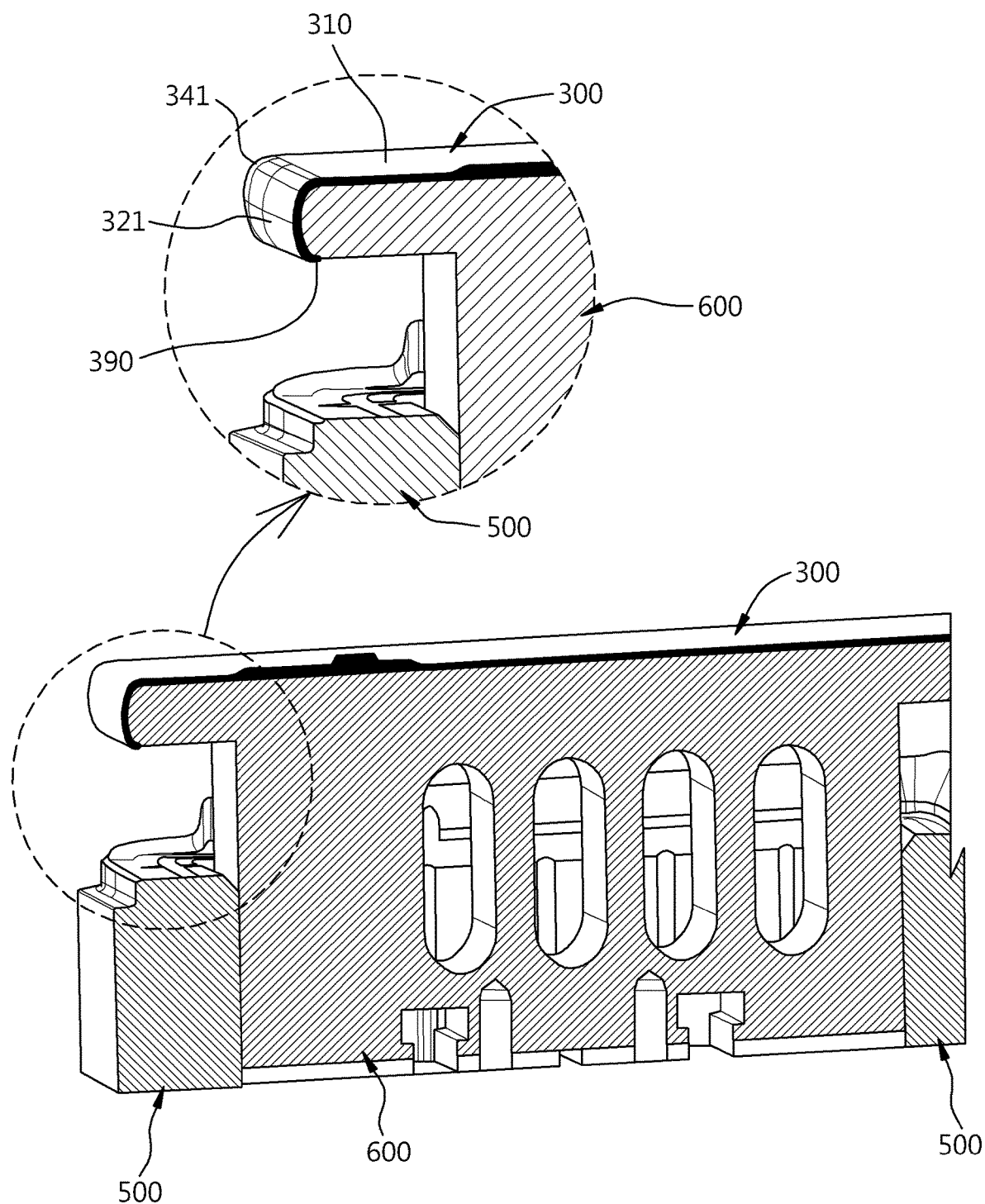
Figure 10:
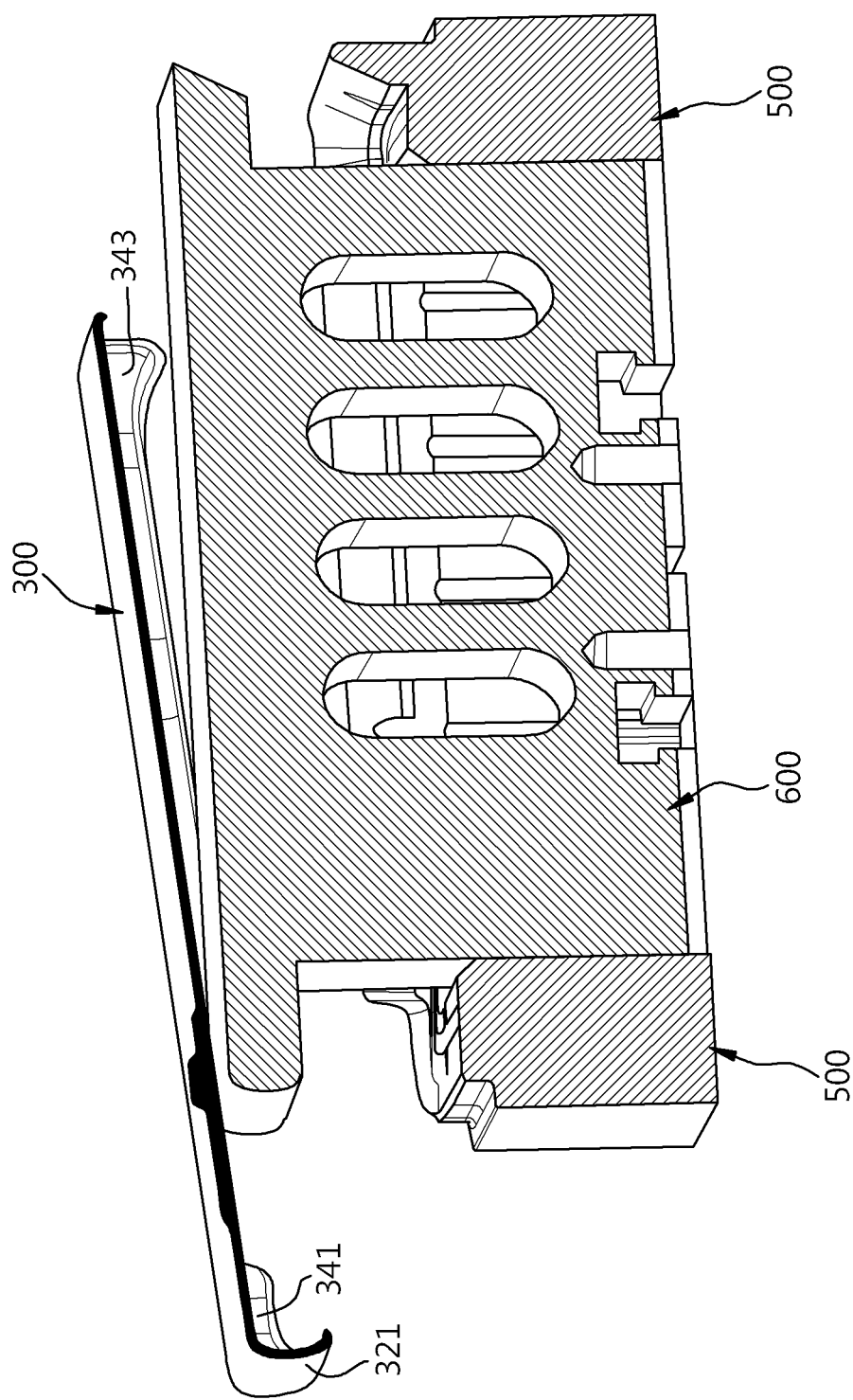

FIGS. 8, 9 and 10 are cross-sectional views illustrating a molding flow of a cover apparatus according to an embodiment.

Referring to FIG. 8, if the second plate (e.g., the first core 500 and the second core 600) in the closed state is coupled with the first plate (e.g., the stationary retainer plate) (not shown), the molding space may be formed by the coupling of the first plate and the second plate 500 and 600, and the molten resin may be injected into the molding space. If the molten resin occupying the molding space is hardened and then the second plate 500 and 600 is transferred from the first plate, the molded part (the cover device) 300 may be disposed on the second plate 500 and 600.

According to an embodiment, the first plate 310 of the cover device 300 may be formed by the molding surface 621 of the second core 600 of the second plate 500 and 600.

According to an embodiment, the first sidewall 321 of the cover device 300 may be formed by the molding surface 622 of the second core 600 of the second plate 500 and 600. The first sidewall 321 may be formed as the laterally convex curve, and may be used as the hooking portion for the electronic device (e.g., 100 of FIG. 1 or 2). The first corner 341 or the second corner (e.g., 342 of FIG. 3) of the cover device 300 may be also used as the hooking portion for the electronic device (e.g., 100 of FIG. 1 or 2).

According to an embodiment, the molding surface 622 of the second core 600 may extend between the first core plate 520 of the first core 500 and the second core plate 620 of the second core 600. Thus, the first sidewall 321, the first corner 341 or the second corner (e.g., 342 of FIG. 3) may have an extended hooking portion 390 to increase the hooking amount.

FIGS. 8 and 9, according to an embodiment, by transferring the second core 600 with respect to the first core 500, the cover device 300 may be separated from the first core 500. If the second core 600 is transferred with respect to the first core 500, the second cover area of the cover device 300 disposed in the second core 600 transferred may pull the first cover area of the cover device 300 disposed in the first core 500, and the first cover area may be separated from the first core 500. The second cover area may include, for example, the first sidewall 321, the first corner 341, the second corner (e.g., 342 of FIG. 3), part of the second sidewall (e.g., 322 of FIG. 3) extending from the first corner 341, part of the fourth sidewall (e.g., 324 of FIG. 3) extending from the second corner 342, or the first plate 310. The first cover area is an area other than the second cover area in the cover device 300, and may include, for example, the third side wall 323, the third corner (e.g., 343 of FIG. 3), the fourth corner (e.g., 344 of FIG. 3), part of the second sidewall (e.g., 322 of FIG. 3) extending from the third corner 343, or part of the fourth sidewall (e.g., 324 of FIG. 3) extending from the fourth corner 344.

According to an embodiment, if the first cover area is separated from the first core 500, the third corner (e.g., 343 of FIG. 3), the fourth corner (e.g., 344 of FIG. 3) or the third sidewall 323 may receive the weight from the first core 500. According to an embodiment, the third corner 343, the fourth corner 344, or the third sidewall 323 may be designed to have a structure which is not damaged (e.g., torn or plastically deformed) by the weight. For example, the third corner 343 or the fourth corner 344 may be designed with a corresponding molding portion of the first core 500 not to cover some area of the front surface 110A beyond the boundary of the side surface (e.g., 110C of FIG. 1) and the front surface (e.g., 110A of FIG. 1), and thus the hooking amount between the third corner 343 or the fourth corner 344 and the first core 500 may be reduced. According to an embodiment, the corresponding molding portion of the first core 500 may be designed such that the third sidewall 323 includes the third cut portion (e.g., 353 of FIG. 3), and thus the hooking amount between the third sidewall 323 and the first core 500 may be reduced.

According to an embodiment, if the second core 600 is transferred with respect to the first core 500, the second cover area disposed in the second core is not loaded from the first core, and accordingly the first corner (e.g., 341 of FIG. 3) of the second cover area, the second corner (e.g., 342 of FIG. 3) or the first sidewall 321 may be more free in designing to increase the hooking amount for the electronic device (e.g., 100 of FIG. 1 or 2), comparing with the third core (e.g., 343 of FIG. 3), the fourth corner (e.g., 344 of FIG. 33) or the third sidewall 323 of the first cover area. For example, the first corner 341, the second corner (e.g., 342 of FIG. 3) or the first sidewall 321 of the second cover area may include the extended hooking portion 390 to increase the hooking amount. According to various embodiments, even though a resin having rigidity such as engineering plastics is used for the injection molding, if the second core 600 is transferred with respect to the first core 500, the first corner 341, the second corner (e.g., 342 of FIG. 3) or the first sidewall 321 may not be damaged. Other various rigid polymers may be used for the injection molding.

Referring to FIG. 10, if the second core 600 is transferred from the first core 500 and then the cover device 300 is pushed toward the first sidewall 321, the cover device 300 may may be separated from the second core 600. The scheme (e.g., sliding separation) for pushing and separating the cover device 300 toward the first sidewall 321 considers the binding structure between the first side wall 321, the first corner 341 or the second corner (e.g., 342 of FIG. 3) and the second core 600, the weight applied to the first side wall 321, the first corner 341 or the second corner 342 may be reduced in the separation process.

Figure 11:
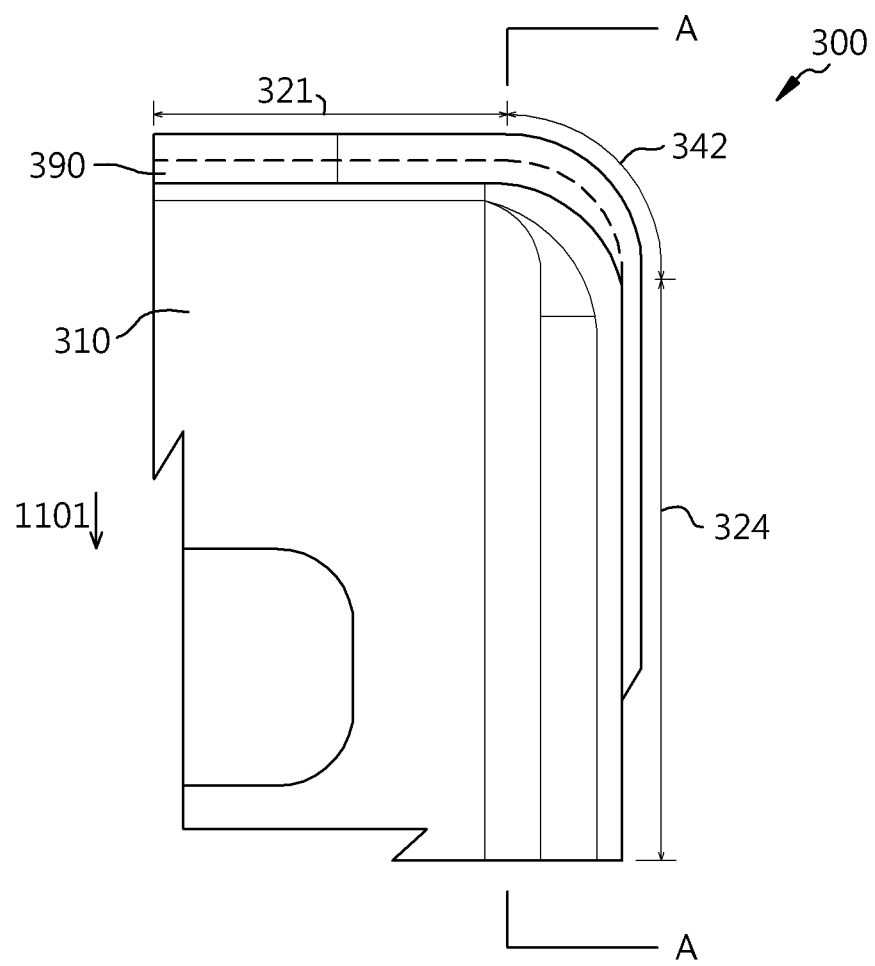
FIG. 11 is a front view of a portion of a cover device according to an embodiment.

FIG. 11 is a front view of a partial portion of a cover device according to an embodiment.

Referring to FIG. 11, the cover device 300 according to an embodiment may include the first plate 310, the first sidewall 321 extending from the first plate 310 and standing with respect to the first plate 310, the fourth sidewall 324, and the second corner 342 between the first sidewall 321 and the fourth sidewall 324.

According to an embodiment, the cover device 300 may include the extended hooking portion 390 extending from the edge of the first sidewall 321 in a second direction 1101 (e.g., 302 of FIG. 3). For example, if the cover device 300 is coupled to an electronic device (e.g., 100 of FIG. 1 or 2), at the first sidewall 321, the extended hooking portion 390 may cover some area of the front surface 110A beyond the boundary between the side surface (e.g., 110C of FIG. 1) and the front surface (e.g., 110A of FIG. 1).

According to an embodiment, the extended hooking portion 390 may extend to the second corner 342. According to an embodiment, if viewed from the front, the width of the extended hooking portion 390 may be gradually reduced in the second corner 342.

According to various embodiments, although not depicted, the extended hooking portion 390 may be also applied to the first corner 341 between the second sidewall (e.g., 322 of FIG. 3) and the first sidewall 321.

Figure 12:
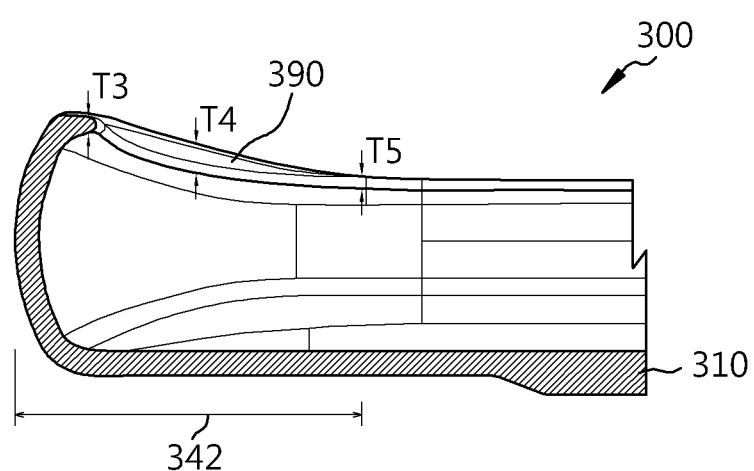
FIG. 12 is a cross-sectional view corresponding to a portion A-A in FIG. 11.

FIG. 12 is a cross-sectional view corresponding to a portion A-A in FIG. 11.

Referring to FIG. 12, according to an embodiment, the extended hooking portion 390 of the second corner 342 may gradually increase from a first thickness T3 to a second thickness T4 and gradually decrease from the second thickness T4 to a third thickness T5 which is equal to or different from the first thickness T3. According to various embodiments, although not depicted, the extended hooking portion provided in the first core (e.g., 341 of FIG. 3) may also be formed to have substantially the same shape as the extension portion of the second corner 342.

Figure 13:
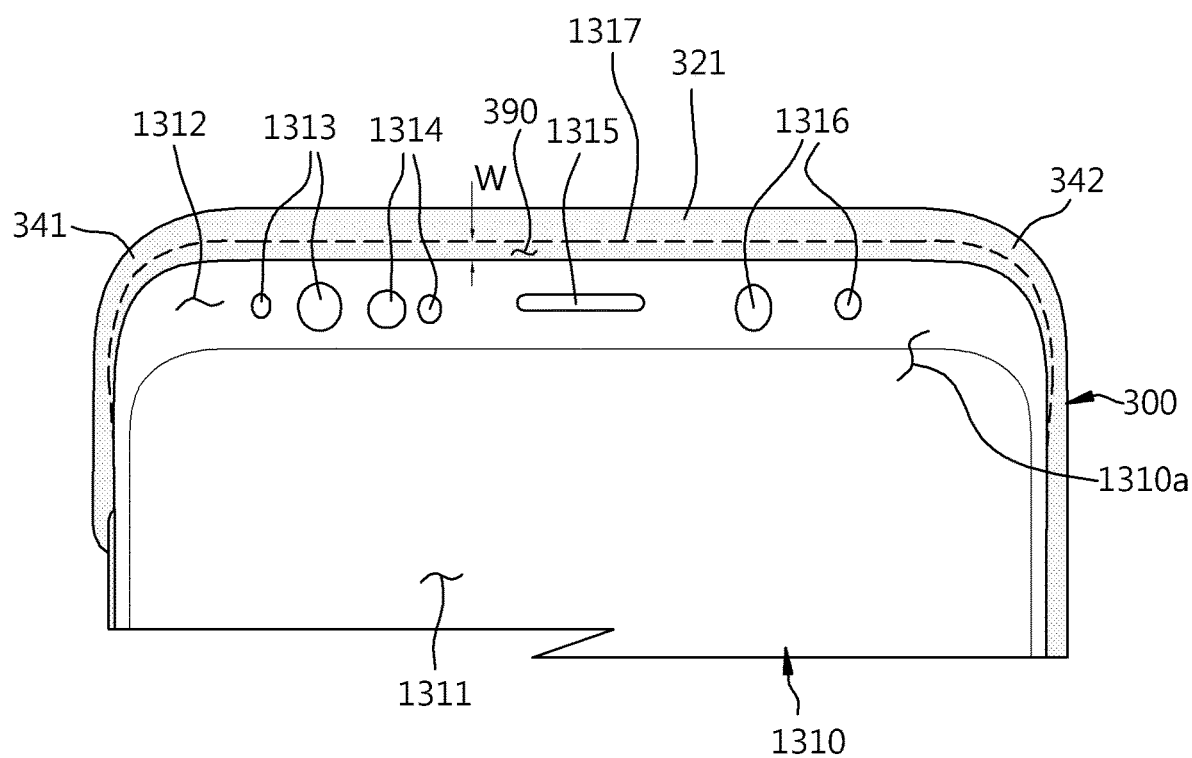
FIG. 13 illustrates a state in which a cover device is coupled with an electronic device according to an embodiment.

FIG. 13 illustrates a state in which a cover device is coupled with an electronic device according to an embodiment.

Referring to FIG. 13, a front surface 1310a (e.g., 110A of FIG. 1) of an electronic device 1310 (e.g., 100 of FIG. 1 or 2) may include an active area 1311 corresponding to a display (not shown), and an inactive area 1312 around the active area 1311. The active area 1311 may include an area which outputs light from the display, or an area in which a touch input or a hovering input to the display is valid. The inactive area 1312 may be used by a light emitting element 1313 (e.g., 106 of FIG. 1), a sensor module 1314 (e.g., 104 of FIG. 1), an audio module 1315 (e.g., 114) or a camera module 1316 (e.g., 105 of FIG. 1) disposed near the active area 1311. If the cover device 300 is coupled to the electronic device 1310 (e.g., 100 of FIG. 1 or 2), the cover device 300 may cover at least part of the rear surface (e.g., 110B of FIG. 2) of the electronic device 1310, and at least part of the side surface (e.g., 110C of FIG. 1).

According to an embodiment, the cover device 300 may include the extended hooking portion 390 extending from its edge along the first sidewall 321, the first corner 341 and the second corner 342. The extended hooking portion may cover a partial area of the inactive area 1312 of the front surface 1310a and thus increase the coupling force between the cover device 300 and the electronic device 1310.

According to an embodiment, at the first sidewall 321, a width W of the extended hooking portion 390 extending from a boundary 1317 between the side surface (e.g., 110C of FIG. 1) and the front surface 1310a (e.g., 110A of FIG. 1) may be greater than or equal to about 2 mm.

According to an embodiment of the present invention, a cover device (e.g., 300 of FIG. 3) may include a first plate (e.g., 310 of FIG. 3) including a first surface (e.g., 310a of FIG. 3) and a second surface (e.g., 310b of FIG. 3) facing away from the first surface, and being substantially rectangular. The first plate 310 may include a first edge (e.g., 311 of FIG. 3) having a first length and extending in a first direction, a second edge (e.g., 312 of FIG. 3) having a second length longer than the first length and extending in a second direction orthogonal to the first direction, a third edge (e.g., 313 of FIG. 3) parallel to the first edge, having the first length, and extending in the first direction from the second edge, and a fourth edge (e.g., 314 of FIG. 3) parallel to the second edge, having the second length, and extending from the first edge in the second direction. The cover device 300 may include a first sidewall (e.g., 321 of FIG. 3) perpendicular to the first surface 310a and extending from the first edge 311, a second sidewall (e.g., 322 of FIG. 3) perpendicular to the first surface 31a and the first sidewall 321 and extending from the second edge, a third sidewall (e.g., 323 of FIG. 3) perpendicular to the first surface 310a and the second sidewall 322 and extending from the third edge 313, and a fourth sidewall (e.g., 324) perpendicular to the first surface 310a and the third sidewall 323 and extending from the fourth edge 314. The first surface 310a, the first sidewall 321, the second sidewall 322, the third sidewall 323 and the fourth sidewall 324 together form a recess (e.g., 330 of FIG. 3) for receiving and holding the electronic device (e.g., 100 of FIG. 1 or 2). The first surface 310a may include at least one parting line (e.g., the first parting line 361, or the second parting line 362 of FIG. 3) having a third length longer than the first length and shorter than the second length and extending in the second direction.

According to an embodiment of the present invention, the first surface 310a may include a first area (e.g., 371 of FIG. 3) adjoining the first edge 311, a first portion 312a of the second edge 312, and a first portion 314a of the fourth edge 314, and a second area (e.g., 372 of FIG. 3) adjoining the third edge 313, a second portion 312b of the second edge 312, and a second portion 314b of the fourth edge 314. The at least one parting line 361 or 362 may be extended substantially across the second area 372, rather than the first area 371.

According to an embodiment of the present invention, the second sidewall 322 may include a first cut portion (e.g., 351 of FIG. 3) extending along the second portion 312b of the second edge 312. The at least one parting line may include a first parting line (e.g., 361 of FIG. 3) extending from the second cut portion 351 to the third edge 313.

According to an embodiment of the present invention, the fourth sidewall 324 may include a second cut portion (e.g., 352 of FIG. 3) extending along the second portion 314b of the fourth edge 314. The at least one parting line may include a second parting line (e.g., 362 of FIG. 3) extending from the second cut portion 352 to the third edge 313.

According to an embodiment of the present invention, the first parting line 361 may be formed at the second edge 312, and the second parting line 362 may be formed at the fourth edge 314.

According to an embodiment of the present invention, the cover device 300 may further include a third parting line (e.g., 363 of FIG. 3) for interconnecting one end of the first parting line 361 and one end of the second parting line 361, and extending in the second direction.

According to an embodiment of the present invention, the third parting line 363 may be formed at the third edge 313.

According to an embodiment of the present invention, the cover device 300 may further include a parting line extending from the other end of the first parting line 361 to the first cut portion 351.

According to an embodiment of the present invention, the cover device 300 may further include a parting line extending from the other end of the second parting line 362 to the second cut portion 352.

According to an embodiment of the present invention, the third sidewall 323 may include a third cut portion (e.g., 353 of FIG. 3) extending along the third edge 313.

According to an embodiment of the present invention, the cover device 300 may further include an extension portion (e.g., the extended hooking portion 390 of FIG. 12) extending from an edge of the first sidewall 321, and covering some surface (e.g., some area of the front surface 110A) of the electronic device 100 coupled with the recess 330.

According to an embodiment of the present invention, the extension portion 390 may be extended to a first corner (e.g., 341 of FIG. 3) between the first side wall 321 and the second side wall 322, or to a second corner (e.g., 342 of FIG. 3) between the first side wall 321 and the fourth side wall 324.

According to an embodiment of the present invention, a width of the extension portion 390 may gradually decrease, at the first corner 341 or the second corner 342 (see FIG. 11).

According to an embodiment of the present invention, at the first corner 341 or the second corner 342, a thickness of the extension portion 390 may gradually increase from a first thickness to a second thickness and then gradually decreases from the second thickness to a third thickness which is equal to or different from the first thickness (see FIG. 12).

According to an embodiment of the present invention, the first sidewall 321 may have a first height, the second sidewall 322 or the fourth sidewall 324 may have a second height which is smaller than the first height, and the third sidewall 323 may have a third height which is greater than the second height and equal to or different from the first height.

According to an embodiment of the present invention, at the first corner 341 between the first sidewall 321 and the second sidewall 322, or the second corner 342 between the first sidewall 321 and the fourth sidewall 324, the second sidewall 322 may gradually increase from the second height to the first height.

According to an embodiment of the present invention, at the third corner 343 between the third sidewall 323 and the second sidewall 322, or the fourth corner 344 between the third sidewall 323 and the fourth sidewall 324, the third sidewall 323 may gradually increase from the second height to the third height.

According to an embodiment of the present invention, the cover device 300 may further include an opening (e.g., 354 of FIG. 3) formed in the first plate 310.

According to an embodiment of the present invention, the cover device 300 may include an engineering plastic.

According to an embodiment of the present invention, the electronic device 100 may include a smart phone.

So far, preferred embodiments of the present invention have been described. One skilled in the art of the technical field which the present invention belongs to will appreciate that the present invention may be implemented in a modified form without departing from the essential characteristics of the present invention. Therefore, the disclosed embodiments should be considered in a descriptive sense and not for purposes of limitation. The scope of the present invention is disclosed in the claims, not in the above-stated descriptions, and all differences within the equivalent scope should be construed as being included in the present invention.

The invention claimed is:

1. A cover device comprising:
a first plate comprising a first surface and a second surface facing away from the first surface, and being substantially rectangular;
the first plate comprising,
a first edge having a first length and extending in a first direction;
a second edge having a second length longer than the first length and extending in a second direction orthogonal to the first direction;
a third edge parallel to the first edge, having the first length, and extending in the first direction from the second edge; and
a fourth edge parallel to the second edge, having the second length, and extending from the first edge in the second direction,
a first sidewall perpendicular to the first surface and extending from the first edge;
a second sidewall perpendicular to the first surface and the first sidewall and extending from the second edge;
a third sidewall perpendicular to the first surface and the second sidewall and extending from the third edge; and a fourth sidewall perpendicular to the first surface and the third sidewall and extending from the fourth edge, wherein the first surface, the first sidewall, the second sidewall, the third sidewall and the fourth sidewall together form a recess for receiving and holding the electronic device, and the first surface comprises, at least one parting line having a third length longer than the first length and shorter than the second length and extending in the second direction.

2. The cover device of claim 1, wherein the first surface comprises:

a first area adjoining the first edge, a first portion of the second edge, and a first portion of the fourth edge; and a second area adjoining the third edge, a second portion of the second edge, and a second portion of the fourth edge, and the at least one parting line is extended substantially across the second area, rather than the first area.

3. The cover device of claim 2, wherein the second sidewall comprises a first cut portion extending along the second portion of the second edge, and the at least one parting line comprises a first parting line extending from the second cut portion to the third edge.

4. The cover device of claim 3, wherein the fourth sidewall comprises a second cut portion extending along the second portion of the fourth edge, and the at least one parting line comprises a second parting line extending from the second cut portion to the third edge.

5. The cover device of claim 4, wherein the first parting line is formed at the second edge, and the second parting line is formed at the fourth edge.

6. The cover device of claim 4, further comprising:

a third parting line for interconnecting one end of the first parting line and one end of the second parting line, and extending in the second direction.

7. The cover device of claim 6, wherein the third parting line is formed at the third edge.

8. The cover device of claim 6, further comprising:

a parting line extending from the other end of the first parting line to the first cut portion.

9. The cover device of claim 6, further comprising:

a parting line extending from the other end of the second parting line to the second cut portion.

10. The cover device of claim 1, wherein the third sidewall comprises:

a third cut portion extending along the third edge.

11. The cover device of claim 1, further comprising:

an extension portion extending from an edge of the first sidewall, and covering some surface of the electronic device coupled with the recess.

12. The cover device of claim 1, wherein the extension portion is extended to a first corner between the first side wall and the second side wall, or to a second corner between the first side wall and the fourth side wall.

13. The cover device of claim 12, wherein a width of the extension portion gradually decreases, at the first corner or the second corner.

14. The cover device of claim 12, wherein, at the first corner or the second corner, a thickness of the extension portion gradually increases from a first thickness to a second thickness and then gradually decreases from the second thickness to a third thickness which is equal to or different from the first thickness.

15. The cover device of claim 12, wherein the first sidewall has a first height, the second sidewall or the fourth sidewall has a second height which is smaller than the first height, and the third sidewall has a third height which is greater than the second height and equal to or different from the first height.

16. The cover device of claim 15, wherein, at a first corner between the first sidewall and the second sidewall, or a second corner between the first sidewall and the fourth sidewall, the second sidewall gradually increases from the second height to the first height.

17. The cover device of claim 15, wherein, at a third corner between the third sidewall and the second sidewall, or a fourth corner between the third sidewall and the fourth sidewall, the third sidewall gradually increases from the second height to the third height.

18. The cover device of claim 1, wherein the electronic device comprises a smart phone.

19. The cover device of claim 1, further comprising:

an opening formed in the first plate.

20. The cover device of claim 1, wherein the cover device comprises an engineering plastic.

* * * * *